United States Patent [19]

Guigan et al.

[11] Patent Number: 4,915,259
[45] Date of Patent: Apr. 10, 1990

[54] DEVICE FOR STORING AND DISPENSING OBJECTS

[76] Inventors: Jean Guigan, 9, rue Jean Mermoz, 75008 Paris; Franck Guigan, 100, rue St Dominique, 75007 Paris, both of France

[21] Appl. No.: 351,132

[22] Filed: May 10, 1989

Related U.S. Application Data

[62] Division of Ser. No. 68,396, Jul. 1, 1987, Pat. No. 4,846,367.

[30] Foreign Application Priority Data

Jul. 1, 1986 [FR] France ................................. 86 09531
Mar. 3, 1987 [FR] France ................................. 87 02841
Mar. 30, 1987 [FR] France ................................. 87 04403

[51] Int. Cl.⁴ .................................................. G07F 11/10
[52] U.S. Cl. ........................................ 221/120; 221/129
[58] Field of Search ................. 221/87, 120, 121, 129, 221/132

[56] References Cited

U.S. PATENT DOCUMENTS 2,363,340 11/1944 Lau et al. ............................... 221/84
2,581,170  1/1952 Carlson ................................ 221/121
3,819,088  6/1974 Guigan ................................. 221/224
4,276,894  7/1981 Heywood ....................... 221/121 X
4,407,430 10/1983 Nehrkorn .

*Primary Examiner*—F. J. Bartuska
*Attorney, Agent, or Firm*—Sughrue, Mion, Zinn, Macpeak & Seas

[57] ABSTRACT

A device for storing and dispensing objects has a plurality of superposed annular magazines constituting a fixed cylindrical structure. An object extraction control member rotatable about an axis by a stepper motor or the like is disposed at each level inside said cylindrical structure and cooperates with elements situated within the object-containing housings. The annular magazines being fixed have the object extraction control members rotatable relative thereto.

4 Claims, 23 Drawing Sheets

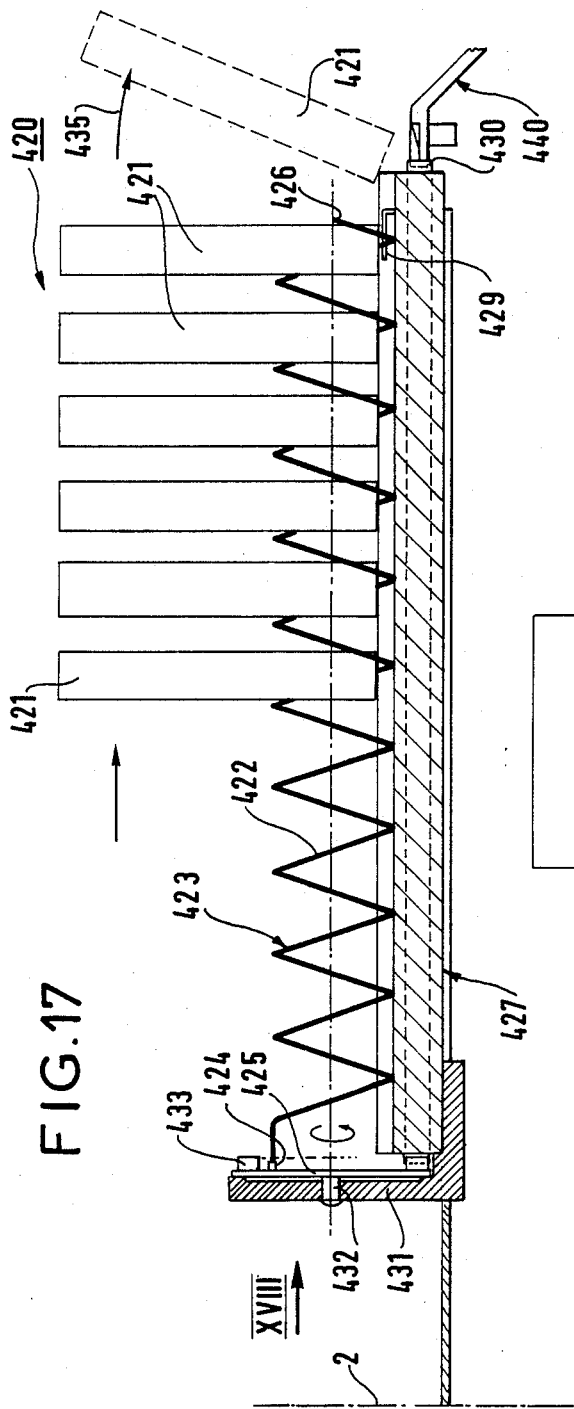
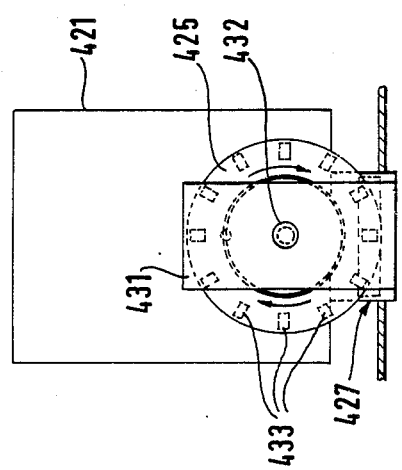
FIG.17
FIG.18

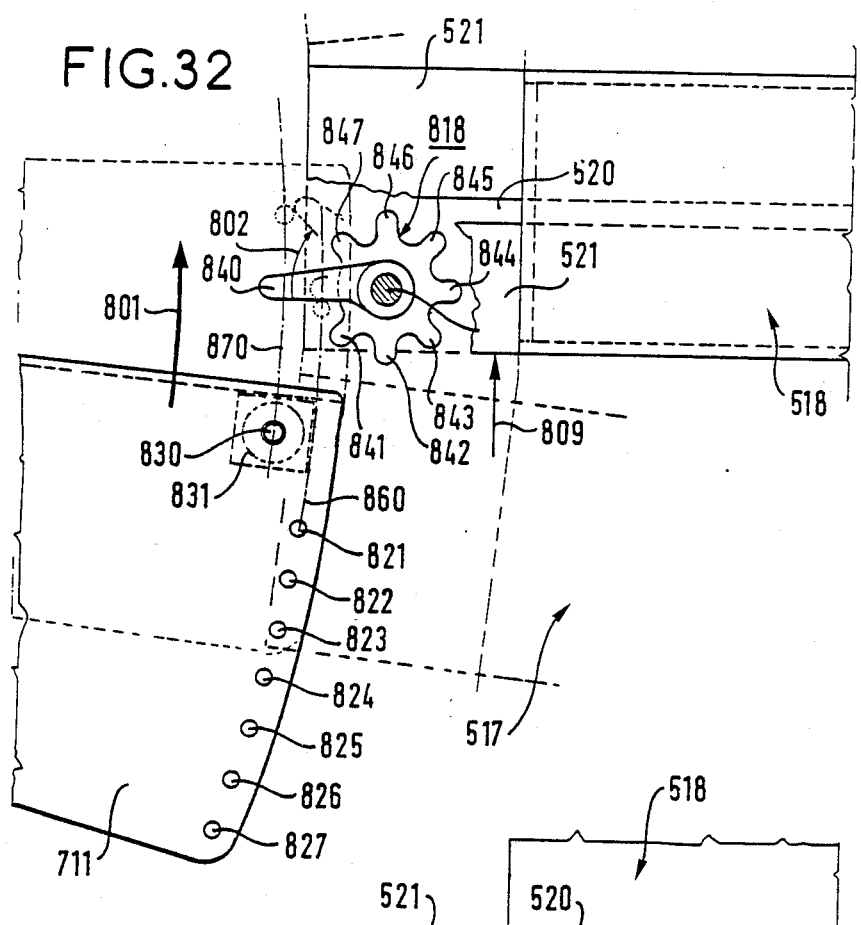
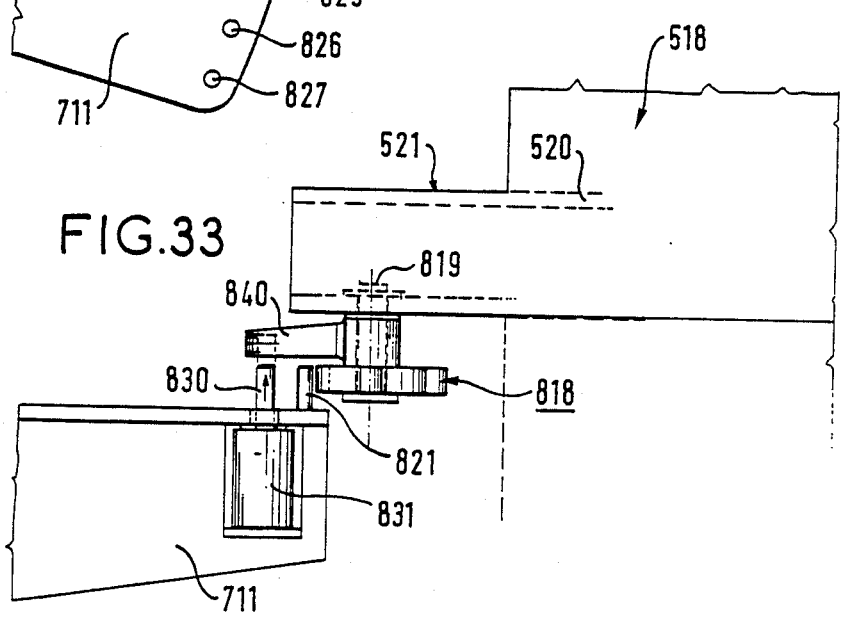

DEVICE FOR STORING AND DISPENSING OBJECTS

This is a divisional of patent application Ser. No. 068,396 filed July 1, 1987 now U.S. Pat. No. 4,846,367.

The present invention relates to a device for storing and dispensing objects. It relates particularly, but not exclusively, to stackable boxes of various sizes, for example cigarette packs, cassettes, books, etc. The objects are preferably in the form of rectangular parallelepipeds, or are contained in packaging of said form.

The present invention is intended to be used, for example, in public places for storing, dispensing, and restocking said objects.

BACKGROUND OF THE INVENTION

U.S. Pat. No. 3 819 088 describes a storage and dispensing device intended, in particular, for selling boxes of medicines. Such a device comprises:

at least one fixed parallelepiped-shaped module containing juxtaposed drawers each divided into vertical compartments for containing respective stacks of objects of a given type; the side walls of each drawer having two facing openings in each compartment suitable for passing one of the objects contained in the compartment, these two openings being in communication with each other via a slot made through the base of said drawer; and mechanical means for removing a drawer from said module by means of a horizontal translation movement, for bringing one of the compartments of said drawer over a removal means common to all of the drawers of a given module and constituted by a conveyor belt extending along the module perpendicularly to said horizontal translation, and provided with an ejector suitable for engaging in said slot.

This storage and dispensing device is particularly well adapted to the needs of a medical dispensary.

The aim of the present invention is to provide a device for storing and dispensing extremely varied objects, which device is better adapted than the prior device to vending in public places, and has a cost which is suitable for such utilization.

SUMMARY OF THE INVENTION

The present invention provides a device for storing and dispensing objects, comprising:

a plurality of superposed annular magazines having a common axis of symmetry and forming a cylindrical structure;

a stepper motor or a motor associated with an angle encoder for rotating said cylindrical structure about its axis.

Each annular magazine includes a plurality of housings for storing either a single box, or else a stack of boxes, or else a row of boxes, and including an opening on the periphery of said cylindrical structure for passing one box only.

Each housing includes in its bottom or its ceiling means for extracting one box contained therein, said means comprising a meshing portion level with said opening and including a vertically truncated tooth whose base is situated in a first horizontal plane with the bases of its other vertical teeth being situated in a second horizontal plane at a lower level than the first horizontal plane.

At least one box extraction control member is provided on the same level as each annular magazine, said control manner being fixed relative to said cylindrical structure and constituted by a plane toothed sector situated between said first and second horizontal planes, said sector being provided with a first controllable moving tooth situated in a non-extraction position in the same plane as the other teeth of said sector and in an extraction position above said first horizontal plane so as to mesh with said truncated tooth of said meshing portion.

A programmed computer controls said moving tooth as a function of its angular position relative to said housings, said angular position being determined by rotation of said motor.

The present invention also provides a device for storing and dispensing objects, characterized by the fact that it comprises a plurality of superposed annular magazines having a common axis of symmetry and constituting a cylindrical structure which is disposed in fixed manner with an internal cylindrical space.

Each annular magazine comprises a plurality of housings for storing either a single box, or else a stack of boxes, or else a row of boxes, and having an opening leading towards said internal cylindrical space for allowing a single box to pass therethrough.

Each housing includes extraction means in its bottom or in its ceiling for extracting a box contained therein, said means including, level with said opening, a meshing portion including a vertically truncated tooth whose base is situated in a first horizontal plane, with the bases of the other vertical teeth being situated in a second horizontal plane at a lower level;

At least one box extraction control member is provided level with each magazine, the assembly of extraction devices constituting a unitary assembly disposed within said internal cylindrical space and suitable for being rotated about said axis by a stepper motor or by a motor associated with an angle encoder, each extraction controlling member being constituted by a plane toothed sector situated between said first and said second horizontal planes, said sector being provided with a controllable moving first tooth situated at the same level as the other teeth in a non-extraction position and at a level above said first horizontal plane in an extraction position so as to mesh with said truncated tooth.

A programmed computer controls said moving tooth as a function of its angular position relative to said housings, said angular position being determined by rotation of said motor.

For example, each magazine includes generally rectangular housings disposed substantially radially relative to the axis of said cylindrical structure.

Each magazine may comprise a disk-shaped tray, and generally rectangular housings of different sizes are disposed in such a manner as to occupy as large an area as possible of said tray.

Each magazine may be constituted by a single molded part.

Each magazine may be constituted by a tray having housings added thereto.

When said housings are provided for storing single boxes or stacks of boxes, the bottom of each housing has a slot opening out into said opening and into a bottom portion which houses a chain having pegs suitable for passing through said slot, said chain constituting said meshing portion which cooperates with said extraction control member.

In this case, said chain is preferably constituted by links which slide over a closed slope having two rectilinear portions interconnected by two semi-circles having substantially vertical axes, with two diametrically opposite links carrying respective ejector pegs suitable for passing through said slot; and with one of said rectilinear portions of said slide being offset downwardly from the plane of said bottom in order to retract one of the pegs beneath said bottom while the other peg performs its ejection function. The length of said toothed sector is not less than one-half of the length of the longest chain situated in a magazine.

In a preferred embodiment of the chain, each link cooperates with the adjacent links by means of a ball and socket type joint.

In an embodiment in which the housings are provided for storing a row of boxes disposed between the turns of a spring, each housing includes a chain in the bottom thereof constituting firstly said meshing portion which co-operates with said extraction control member and secondly co-operating at the opposite end from the removal opening of the housing with sprockets of a vertical wheel which is fixed at one of the ends of the spring.

The chain, which may be analogous to the above-described chain no longer includes pegs that need retracting. Several of its links may include truncated teeth, with a box being extracted by one complete turn of the vertical sprocket wheel.

In another embodiment where said housings are provided for storing a row of blister packs having their tops hooked to the bottom portions of the turns of a spring, each housing includes a chain in its ceiling constituting firstly said meshing portion which co-operates with said extraction control member, and secondly co-operating at the opposite end of the housing from the removal opening thereof with the sprockets of a vertical wheel to which one end of the spring is fixed.

It can be seen that in all of the above-mentioned embodiments, a box is extracted merely by the relative motion of the cylindrical storage structure and the extraction control member using a moving tooth.

The toothed sector and the chain both lie in horizontal planes, at least where they mesh.

In another embodiment based on the same prinicple of extracion by means of relative movement, an extraction control member may be provided in a horizontal plane while each housing is provided with a chain lying in a vertical plane, with motion transmission means being provided therebetween.

The present invention thus also provides, a device for storing and dispensing objects, the device comprising a plurality of superposed fixed annular magazines having a common axis of symmetry, each magazine including a top portion having radial housings each suitable for containing a stack of objects of a given type, the wall of each housing closest to said axis having an opening for passing the bottom object of the stack, the bottom of each housing having a slot opening out into said opening and into a bottom portion for each of said housings in which extraction means for the bottom object of the corresponding stack are disposed, said extraction means including a mechanical device for transmitting motion and provided with a chain including pegs suitable for passing through said slot. A unitary assembly for controlling the extraction means is situated in the cylindrical space inside the annular magazines and is rotated about said common axis of symmetry by a stepper motor or a motor having an angle encoder, said assembly bearing at least one arm at each level corresponding to a magazine, a first end of the arm having a shaft disposed about said axis of symmetry and received in the shaft of the arm situated at a higher or lower level thereto, the opposite end of said arm bearing a controllable mechanical member including a retractable finger describing a circular trajectory during the movement of said unitary assembly and capable during its motion of optionally driving said motion transmission device.

A programmed computer is provided to control said mechanical member as a function of its angular position relative to said housings, said angular position being defined by said stepper motor or by said motor with an angle encoder.

The motion transmission device includes a wheel including only on tooth lying on the trajectory of said retractable finger, and the other teeth of the wheel are suitable for cooperating with fixed fingers disposed in the proximity of said controllable mechanical member whenever said fixed fingers move along a circular trajectory having a different diameter from the trajectory of said retractable finger. Said wheel transmits its motion via a set of gears to said chain having pegs and lying in a vertical plane.

BRIEF DESCRIPTION OF THE DRAWINGS

Embodiment of the invention are described by way of example, with reference to the accompanying drawings, in which:

FIG. 17 is a longitudinal section through an example of a housing in a variant device in accordance with the invention and intended for containing a row of boxes;

FIG. 18 is a side view along arrow XVIII of FIG. 17;

FIG. 32 is a diagrammatic fragmentary plan view of a variant of the FIG. 28 extraction means and their control member;

FIG. 33 is a side view in elevation corresponding to arrow 801 of FIG. 32; and

MORE DETAILED DESCRIPTION

Figure 1:
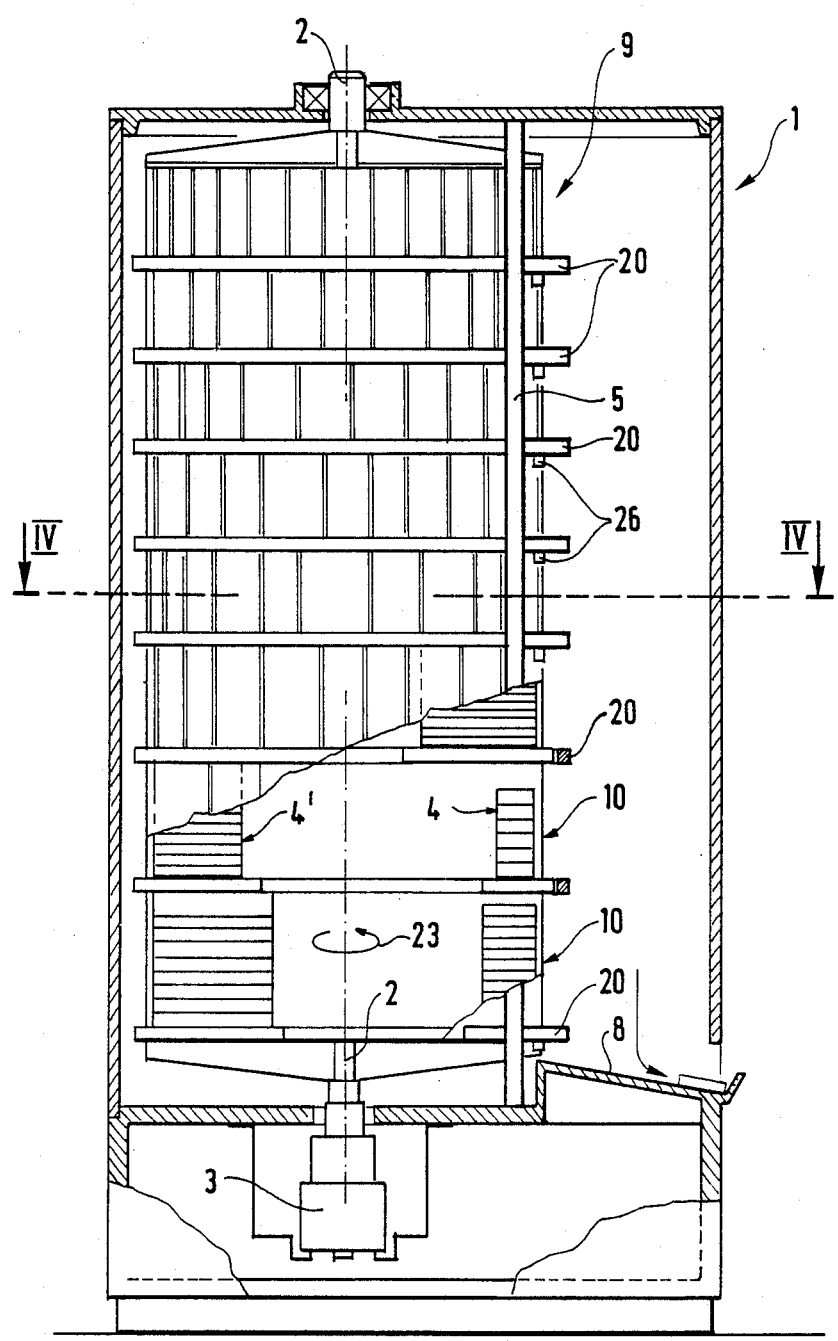
FIG. 1 is a diagrammatic elevation view partially in section and partially cut away of an example of a device in accordance with the invention.

FIG. 1 is a partially cutaway overall view of one example of a device in accordance with the invention. It shows a frame 1 containing a stack of annular magazines such as the magazine 10 having a common axis 2 and fixed to one another. As shown in greater detail below, each magazine is provided with radial housings each containing a stack of boxes 4, 4' of a given type. The above-described cylindrical structure 9 about the axis 2 is rotated about said axis by a stepper motor 3 or by a motor associated with an angle encoder. The direction of rotation is represented by arrow 23. Reference 8 indicates the zone from which an object extracted from the device may be retrieved.

Figure 2:
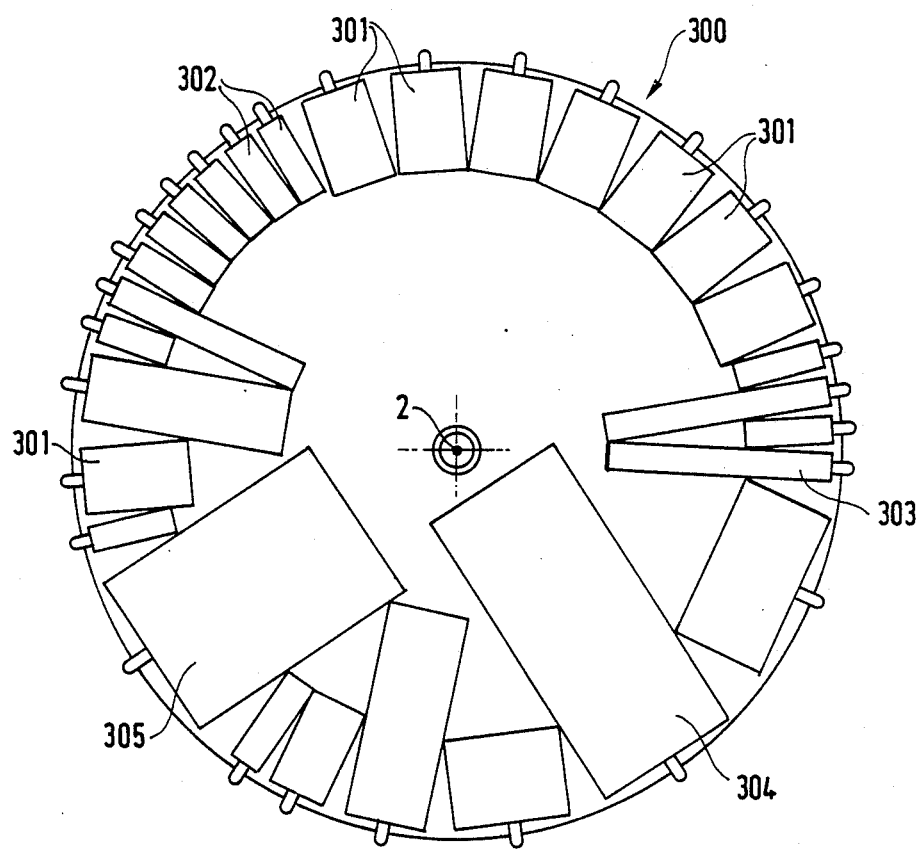
FIG. 2 shows an example of how objects of different sizes may be disposed on a tray of an annular magazine in accordance with the invention.

FIG. 2 gives another diagrammatic example of a disposition for housings on an annular magazine referenced 300. The housings are of different sizes but they are all oriented in the same way, i.e. generally radially. The housings 301 are intended, for example, for receiving stacks of cassettes; the housings 302 are intended for receiving cassettes or cigarette packs standing on edge; the housings 303 are intended for receiving packs containing two cassettes standing on edge; the housings 303 and 305 may contain stacks of books, or of various cosmetics boxes, etc. All of the housings have a removal opening at the periphery of the magazine 300.

Figure 3:
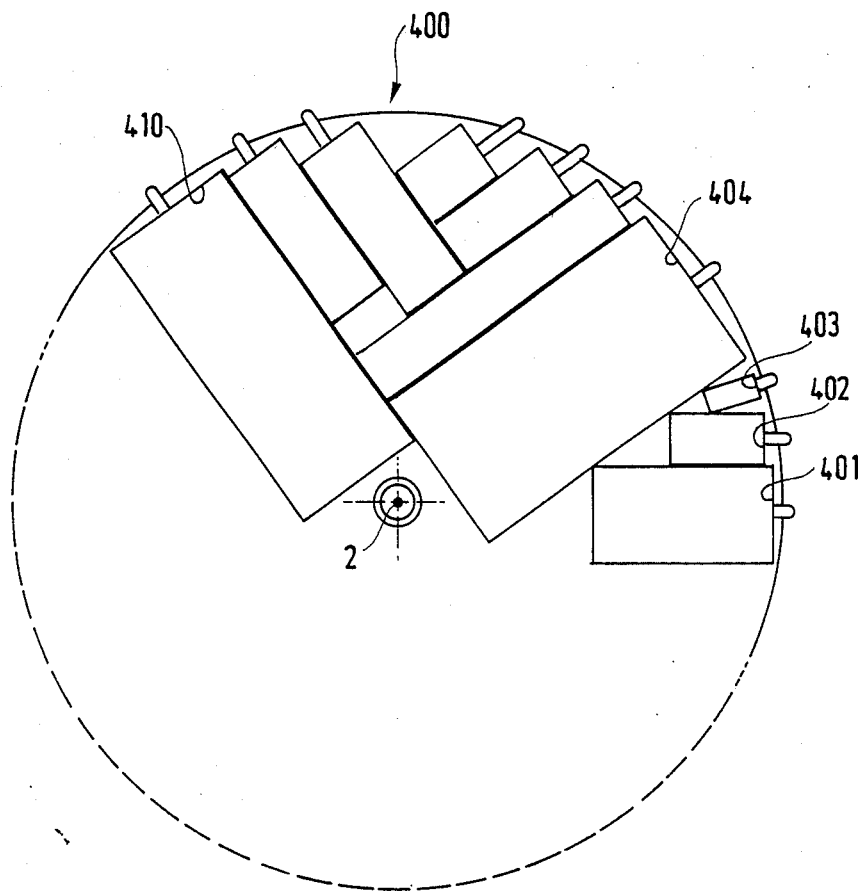
FIG. 3 shows another way in which objects of different sizes may be disposed on a tray of an annular magazine in accordance with the invention.

In the variant shown in FIG. 3, a magazine 400 does not have all of its housings oriented radially relative to the axis 2. The housings are disposed so as to occupy as large an area as possible of the base tray of the magazine 400 and they all have their removal openings 401, 402, 403, 404, . . . 410 situated at the periphery of the magazine 400. These magazines may be made from a base tray with partitions, or else with add-on housings fixed thereto in any appropriate way.

Figure 4:
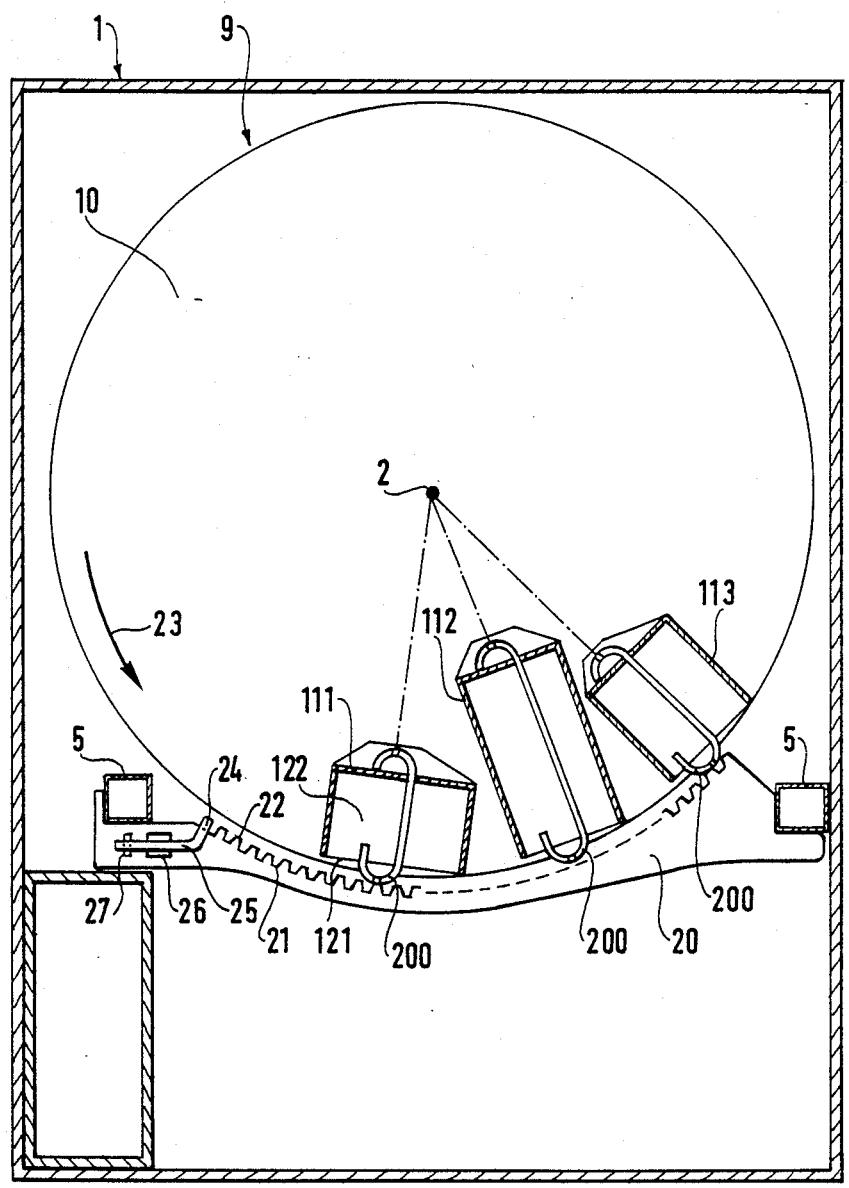
FIG. 4 is a diagrammatic section view on line IV—IV of FIG. 1 showing a portion of a magazine belonging to a device in accordance with the invention and associated with a member for controlling object-extraction means.

With reference to FIG. 4, it can be seen that an object is extracted from a housing 111, 112, 113, . . . of a magazine 10 by a control member 20 which is situated outside the cylindrical structure 9. The various control members 20 are fixed at each level of the device in the vicinity of columns 5. Each member is essentially constituted by a metal sector having teeth along its periphery 21, with a first fixed tooth referenced 22. Ahead of this tooth there is a moving tooth 24 mounted on an arm 25 which pivots about an axis 27 under the control of an electromagnet 26.

Figure 5:
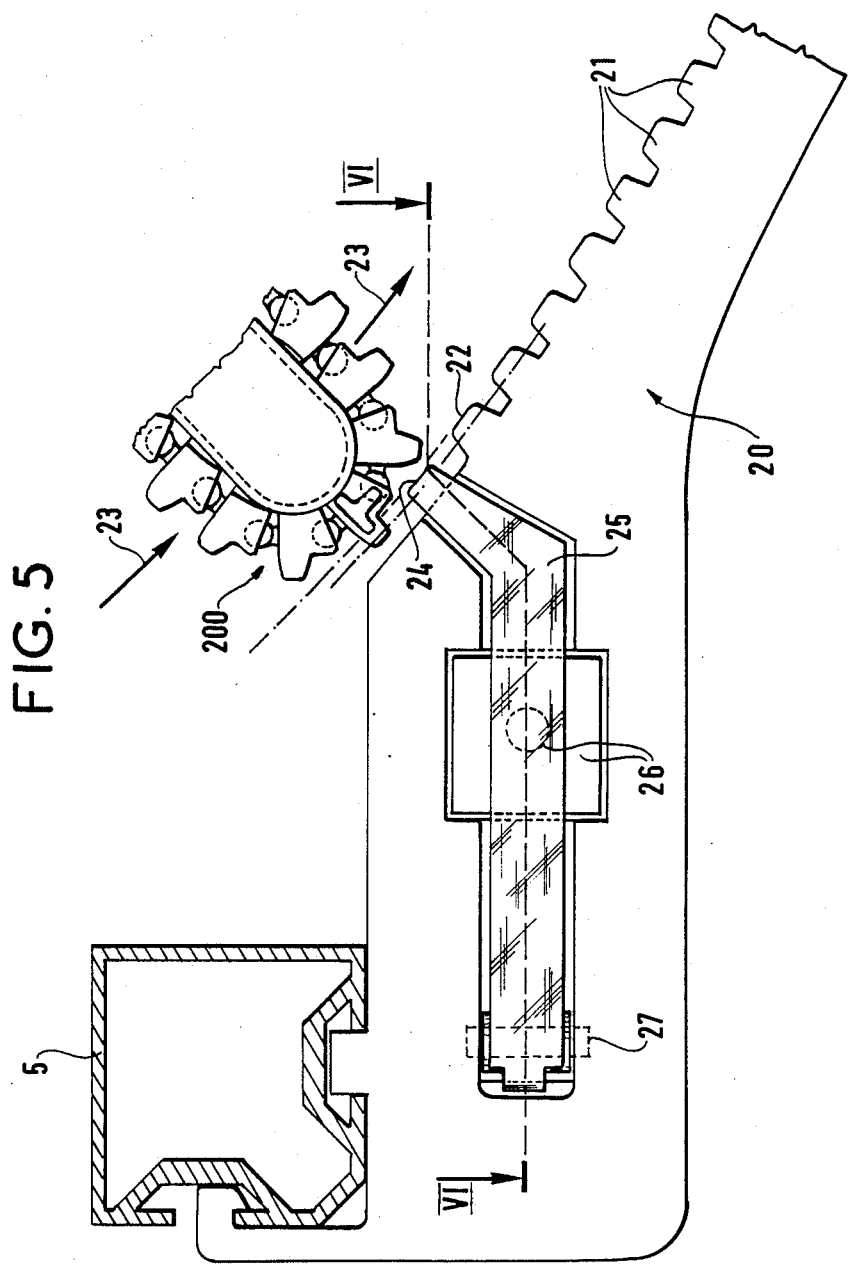
FIG. 5 is a diagrammatic plan view showing in greater detail the important portion of the FIG. 4 control member for the object extraction means.
Figure 6:
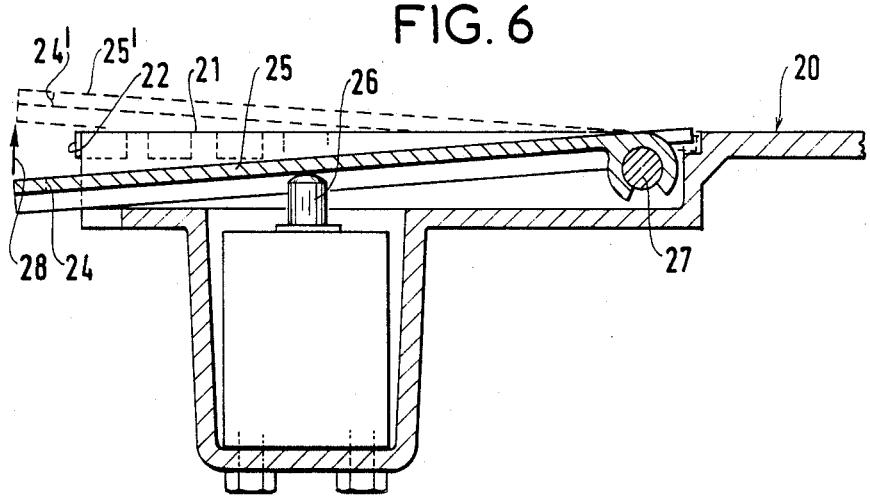
FIG. 6 is a fragmentary section view on line VI—VI of FIG. 5.

These items are shown on a larger scale in the plan view of FIG. 5. When the electromagnet 26 is not excited, the tooth 24 is located ahead of the tooth 22 and in the same plane. When the electromagnet 26 is excited (cf. FIG. 6), the arm 25 supporting the tooth 24 is urged upwardly in the direction of arrow 28 to take up a position 25'-24' shown in dashed lines, and situated at a higher level than the level of the teeth 21-22.

The object-extraction control member 20 is intended to cooperate with a toothed portion belonging to chains 200 situated beneath respective bottoms 122 of the housings 111, 112, 113 of the annular magazines 10 (see FIG. 4). One such chain is now described in detail with reference to FIGS. 9 to 15.

The chain 200 comprises a plurality of identical links 201 which co-operate with one another by means of ball and socket joints.

Figure 10:
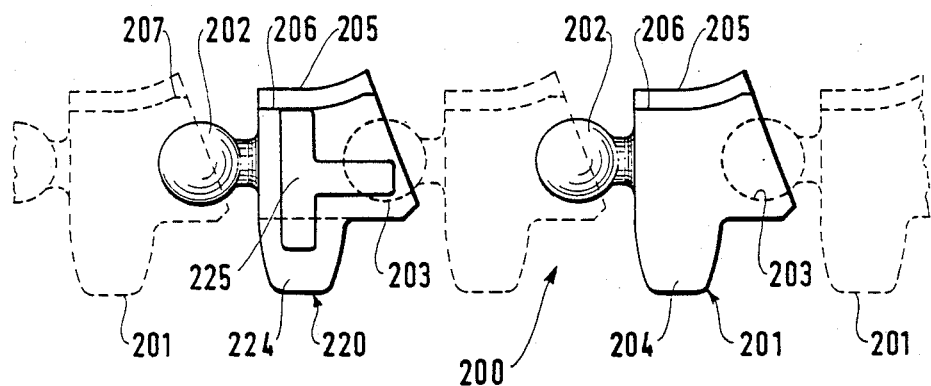
FIG. 10 is a view on an enlarged scale of a few links of the FIG. 9 drive chain.
Figure 12A:
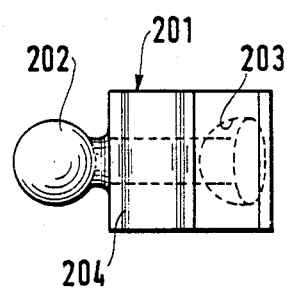
FIG. 12A is an elevation view of a normal link belonging to the FIG. 10 drive chain.
Figure 12B:
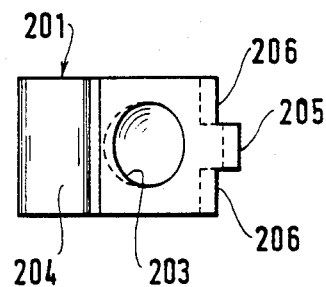
FIG. 12B is a side view of the FIG. 12A link.

A link 201 is shown in plan view in FIG. 10 and is shown in elevation in FIG. 12A with its ball 202 and its cavity 203, and is shown as a side view in FIG. 12B. The portion 204 of the link constitutes a tooth of the chain 200 whereas the faces 205 and 206 constitute guide faces for guiding the chain over its slide. It can be seen in FIG. 12B that the tooth 204 extends over the full height of the link 201.

Figure 11A:
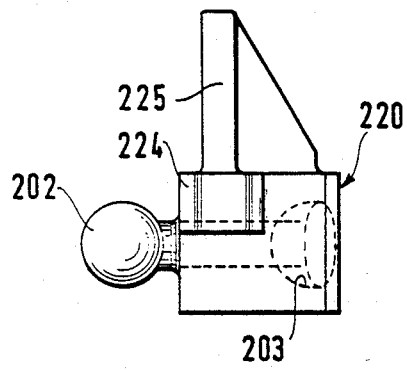
FIG. 11A is an elevation view of an ejector link belonging to the FIG. 10 drive chain.
Figure 11B:
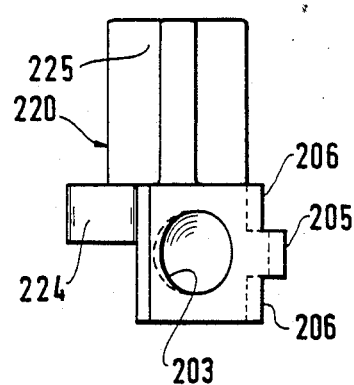
FIG. 11B is a side view of the FIG. 11A ejector link.

The chain 200 also includes two special diametrically opposed links 220 and 230 which are identical in shape and which are intended for extracting objects. FIG. 10 shows the link 220 in plan view together with its ball 202, its socket 203 and its tooth 224. FIG. 11A shows the same link in elevation and FIG. 11B is a side view thereof. It should be observed that the tooth 224 of the link 220 has its bottom part missing and is thus truncated in comparison with the tooth 204 of either adjacent link 201. However, the links 220 and 230 have guide faces 205 and 206 just like the links 201. In addition, they are each provided with an ejector peg 225 which stands up above the plane of the links.

Figure 9:
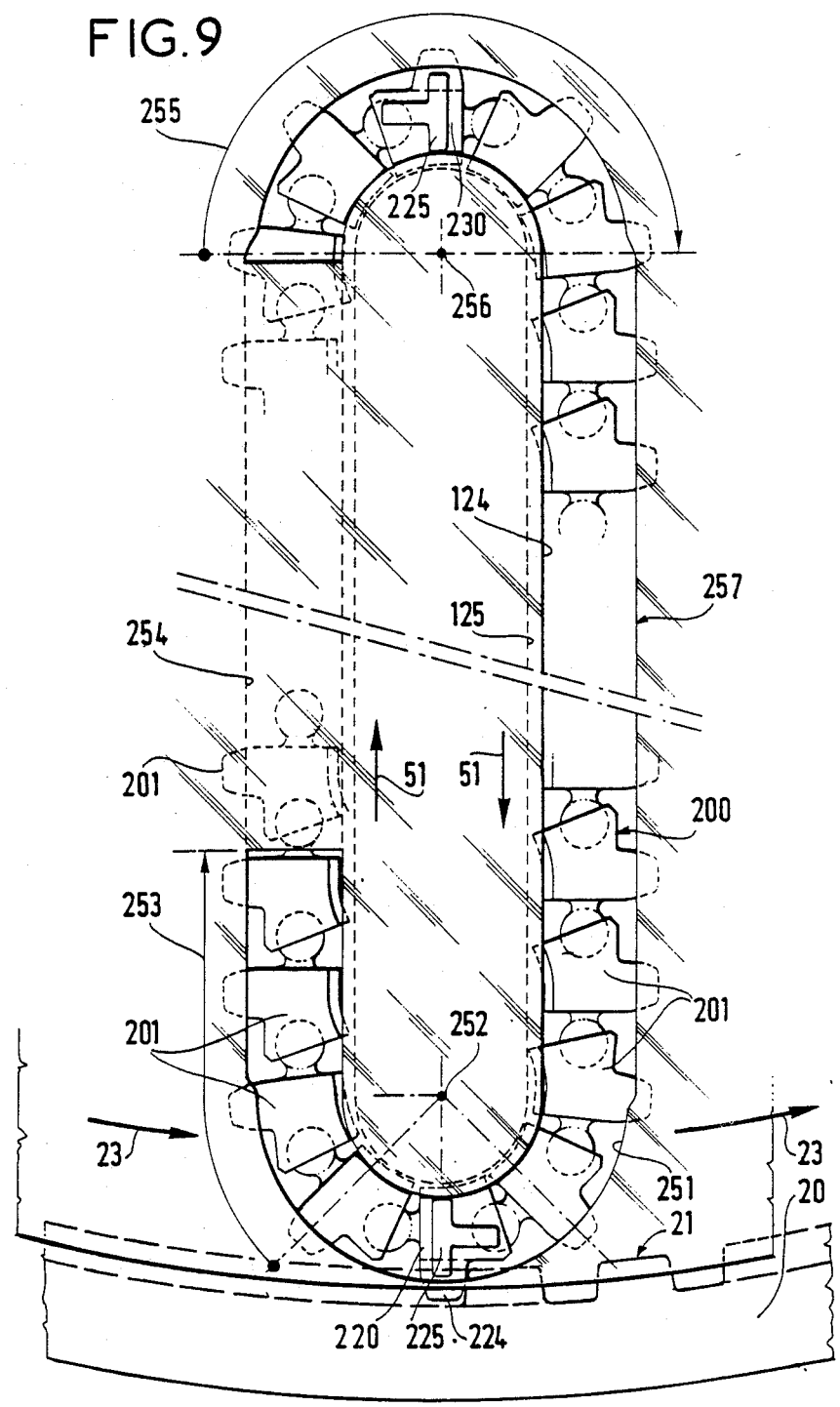
FIG. 9 is a plan view of an object drive chain in accordance with the invention situated beneath a housing of an annular magazine.
Figure 13:
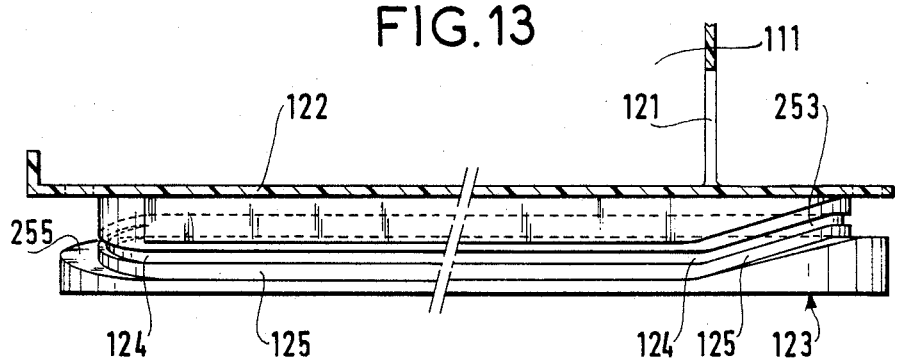
FIG. 13 is a longitudinal view in partial section of a housing of an annular magazine showing its bottom compartment for containing the FIG. 9 drive chain.
Figure 14:
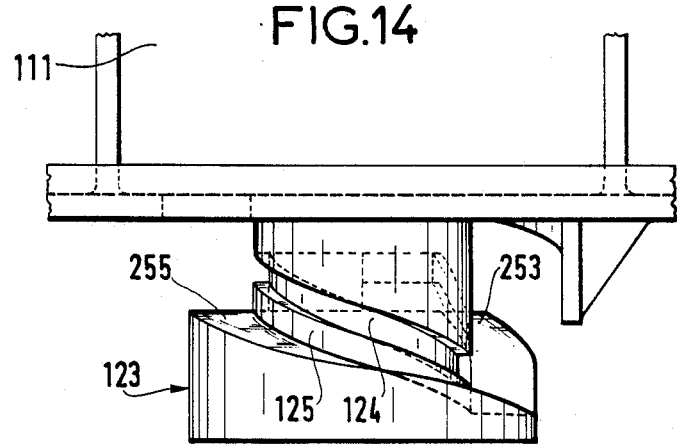
FIG. 14 is a side view corresponding to the FIG. 13 longitudinal view.

The chain shown in FIGS. 9 and 10 is intended to cooperate with a slide visible in FIGS. 13 and 14, and when on the side the chain appears as in the plan view of FIG. 9.

FIG. 13 shows a housing 111 with its bottom 122 and its opening 121 for removing an object therefrom. This bottom comprises a support 123 defining a slide for the chain 200 and in particular by its faces 124 and 125 which constitute a groove and which are intended to come respectively into contact with the faces 205 and 206 of the links of the chain 200. The groove formed in this way does not occupy a horizontal plane since it is essential that during extraction only one ejector peg 220 or 230 should be located above the level of the bottom 122 in order to push against the object.

Thus (see FIG. 9) it can be seen that a first end zone 251 of the chain constitutes a semi-circle about a center 252, followed by a zone 253 where the slide moves down from the plane of the first zone to a level where a zone 254 of the chain completely retracts the top portion of an ejector peg 220 or 230. There is another semi-circular zone 255 about a center 256 and thereafter the peg may again emerge from its slot, followed by a linear zone 257 going back to the circular zone 251.

The portion of slot illustrated in solid lines in FIG. 9 also appears in solid lines in FIG. 4 in the bottoms of the housings 111, 112, and 113.

Figure 15:
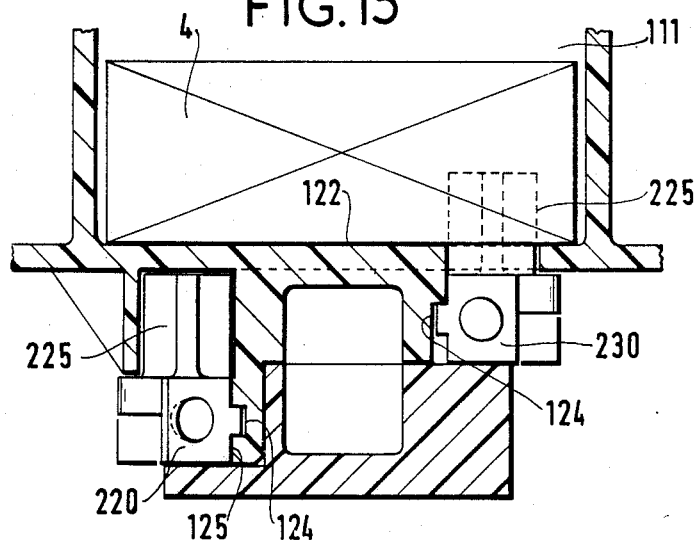
FIG. 15 is a fragmentary cross-section view of a housing including its compartment containing the chain in accordance with the invention.

The situations of these two pegs can clearly be seen in FIG. 15 where the peg 230 is acting as an ejector for packet 4 while the peg 220 is retracted beneath the bottom 122.

The device in accordance with the invention operates as follows: each housing 111 is defined by the level of its magazine 10 and by a coded value of the angle of rotation of the motor 3. The cylindrical structure 9 rotates in the direction indicated by arrow 23 (FIGS. 1 and 5).

When not operated, the tooth 24 of the member 20 is in its low position and does not engage the chains 200.

Figure 7:
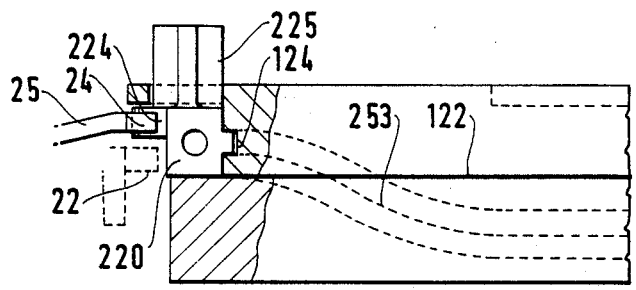
FIG. 7 is a transverse view partially in section showing how the extraction control member co-operates with an ejector link of a drive chain situated beneath a housing of an annular magazine in accordance with the invention.
Figure 8:
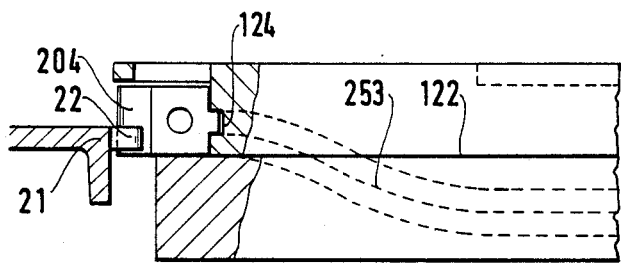
FIG. 8 is a view similar to FIG. 7 showing how the extraction control member co-operates with a normal link of said chain in accordance with the invention.

When operated, the tooth 24 of the member is raised to its upper position by the electromagnet 26 (see FIG. 6) immediately prior to the magazine 111 passing thereover (see FIG. 7). It therefore comes into contact with the truncated tooth 224 of the ejector link 220 (compare with the position of FIG. 7). As the magazine rotates about its axis 2, it begins to drive the chain 200, and the tooth 22 followed by the teeth 21 of the toothed sector then take up the drive by engaging the teeth 204 of the ordinary links 201 (see FIG. 8).

During this time (see FIG. 9), the chain 200 moves in the direction of arrows 51, with the peg 220 disappearing beneath the bottom 122 at the zone 254 while the peg 230 acts as an ejector and thrusts the object 4 towards the outlet 121 from the housing. The object then falls into the reception zone 8.

When extraction is over, the link 230 occupies the position of the link 220 in FIG. 9.

All of the teeth are preferably made of molded plastic material.

The teeth could co-operate with one another by assembly means other than a ball and socket joint.

The chain in accordance with the invention is particularly advantageous since it does not require gear wheels to be used. Naturally, in another variant, gear wheels could be placed centered at 252 and 256 without going beyond the scope of the invention. In any event, the chain co-operates with the extraction control member 20 without any intermediate gear system, which is highly advantageous mechanically.

Figure 16:
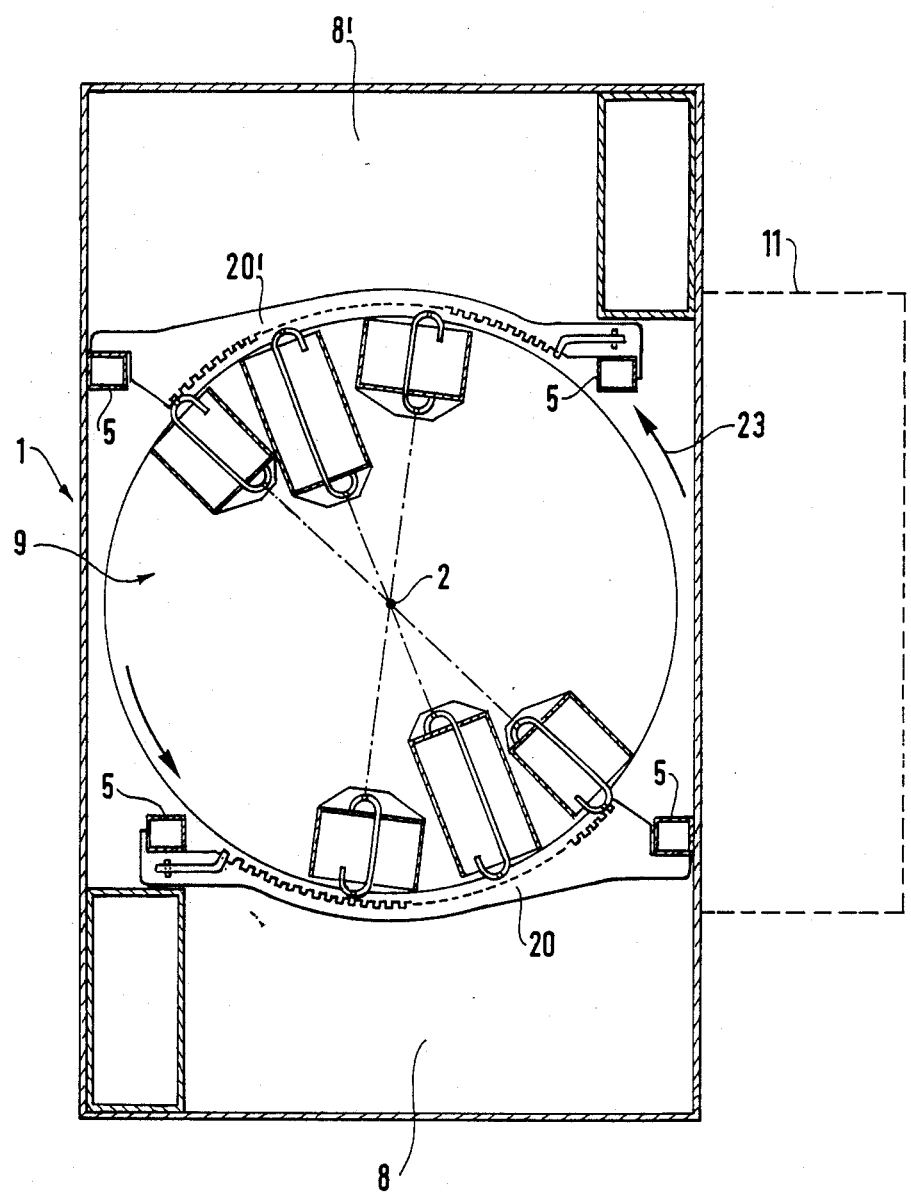
FIG. 16 shows a variant of the FIG. 4 device comprising a plurality of extraction control members at each level.

In a variant, as shown in FIG. 16, a second extraction control member 20' and associated reception zone 8' could be disposed around the cylindrical structure 9, or even a third member as represented by a dashed rectangle 11, and a fourth, thereby enabling several customers to be served simultaneously.

In the variant embodiment shown in FIGS. 17 to 21, housings are provided for storing a row of boxes.

FIG. 17 shows a row 420 of boxes 421 interposed between the turns 422 of a spring 423, with a first end 424 of the spring being fixed to a vertical wheel 425 and with the other, free end of the spring 426 being held in a guide 429. The bottom 427 of the housing contains a chain 430 analogous to the above-described chain 200, but received in a horizontal groove rather than in a sloping slide. For example, the chain 430 comprises sixty links, five of which have a truncated tooth like the tooth 224 of FIG. 11B.

The wheel 425 fixed to a support 431 is capable of being rotated about its axis 432 by sprockets 433. These sprockets co-operate with the teeth of the chain 430 when the teeth situated at the opposite end of the housing co-operate with the extraction control member 440 disposed in fixed manner, as shown in FIG. 4. In the example shown, the wheel 425 has twelve sprockets.

When a box 421 is to be extracted from its housing, the member 440 operates as the housing passes in front of it and meshes with a truncated tooth of the chain 430, and thereafter with the other teeth. At the opposite end of the chain, the teeth rotate the wheel 425 through one turn, and consequently rotate the spring 423 whose last turn 426 releases the first box from the row, which box then tilts in the direction of arrow 435. When the extraction operation is completed, a truncated tooth is again level with the extraction control member 440.

Figure 20:
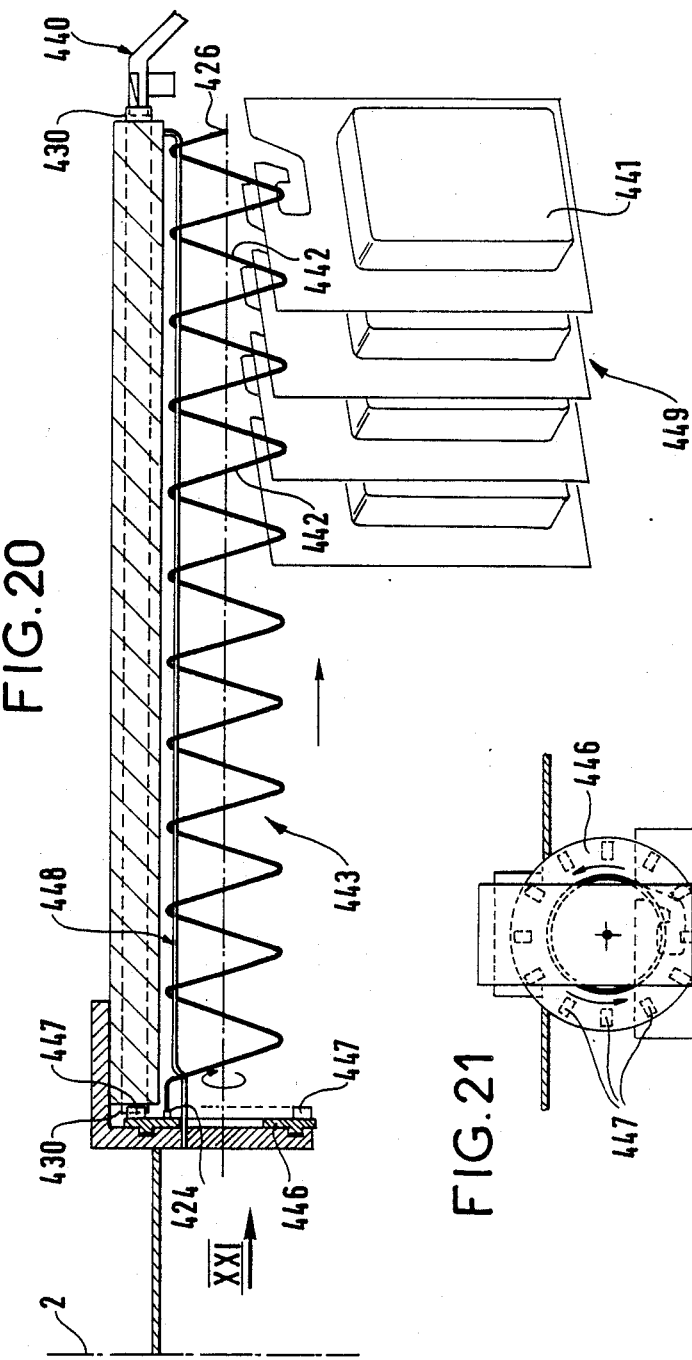
FIG. 20 is a longitudinal section through a variant of the FIG. 17 housing containing a row of blister packs.
Figure 21:
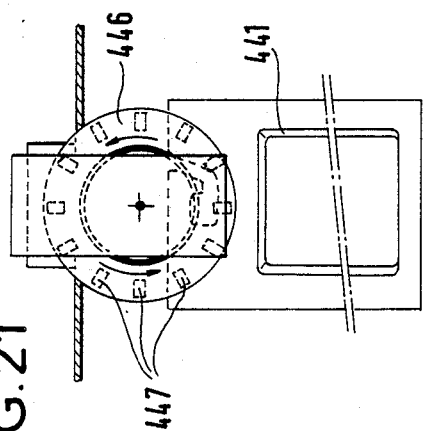
FIG. 21 is a side view along arrow XXI of FIG. 20.

FIGS. 20 and 21 show a housing for containing a row 449 of blister packs 441. These packs are hooked over the bottom portions of the turns 442 of a spring 443 which is itself suspended from a bar 448 running along the ceiling of the housing. A chain 430 entirely similar to the chain shown in FIG. 17 is located in said ceiling and is intended to cooperate with an extraction control member 440. As in the preceding variant, one end 424 of the spring is fixed to a wheel 446 having sprockets 447. As above, the sprockets cooperate with the teeth of the chain 430 when the extraction control member 440 is operated. The wheel 446 and the spring 448 rotate through one turn and the first blister pack 441 is detached from the turn 426 and the row 449.

Figure 19:
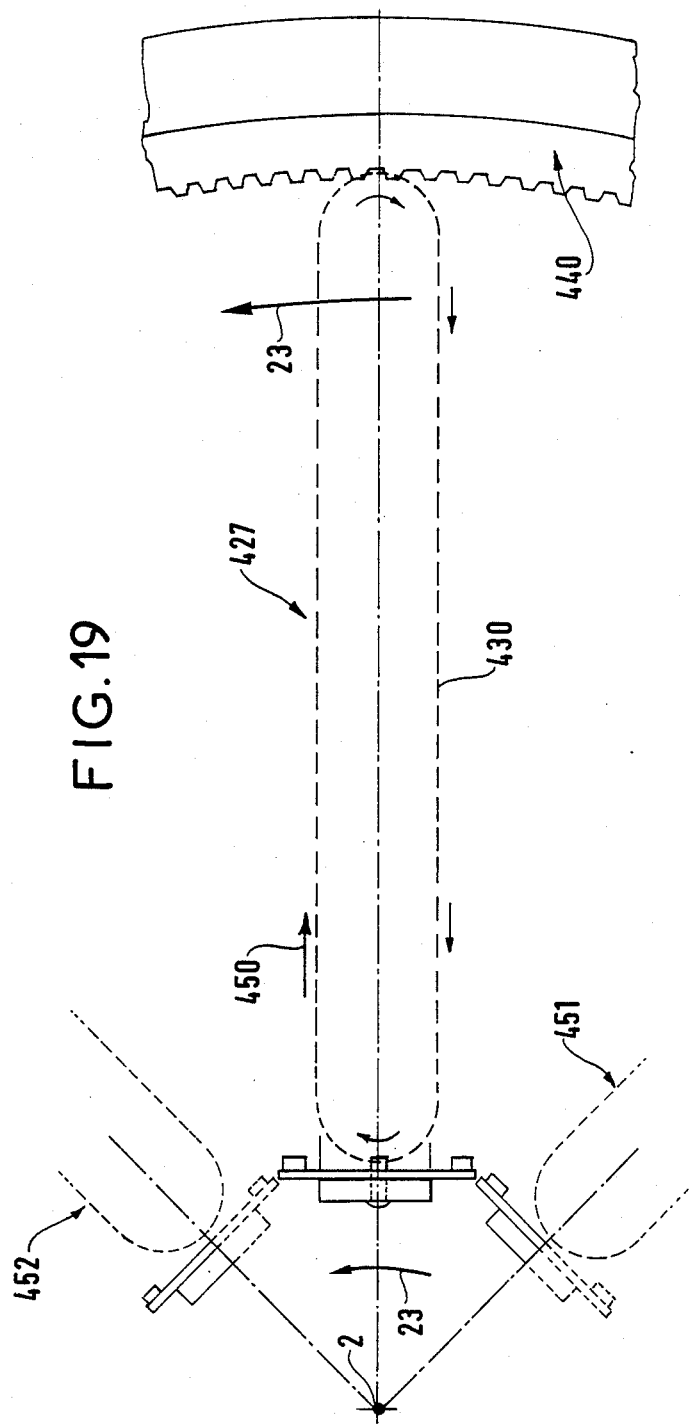
FIG. 19 is a highly diagrammatic plan view of the chain in the FIG. 17 housing in association with its extraction control member.

FIG. 19 is a plan view showing the axis 2 of the cylindrical assembly of magazines, and the direction of rotation 23 of said assembly relative to the extraction control member 440. A chain 430 is marked in highly diagrammatic manner together with its motion by means of an arrow 450. Dashed lines 451 and 452 indicate adjacent housings.

In all the above-described variants, the cylindrical structure constituted by the annular magazines rotates relative to extraction control members which are on the outside of the structure. In the variants described below, the cylindrical structure of annular magazines is fixed and the extraction control members are rotatably mounted inside the cylindrical structure.

Figure 22:
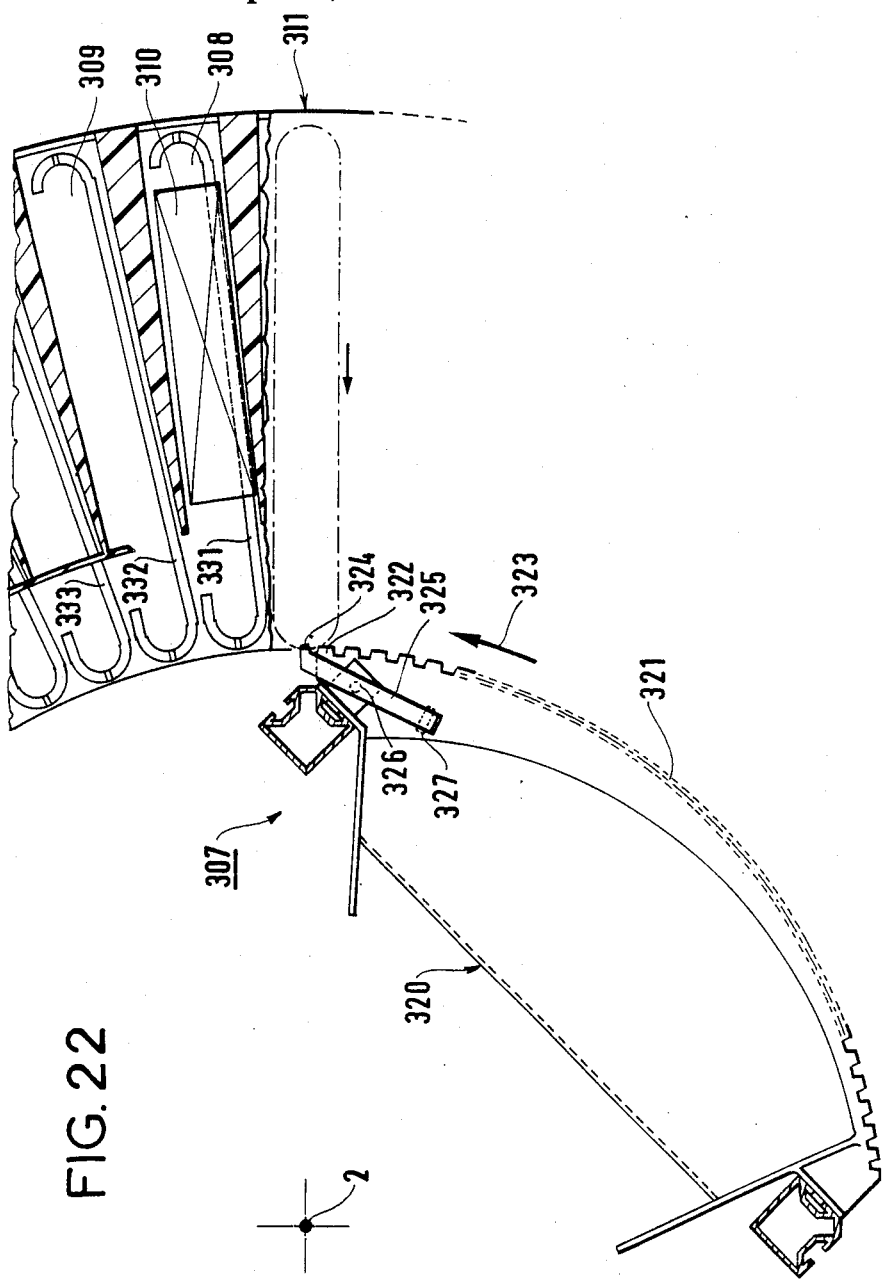
FIG. 22 is a diagrammatic fragmentary plan view in partial section of a fixed annular magazine having a rotary internal extraction control member.
Figure 23:
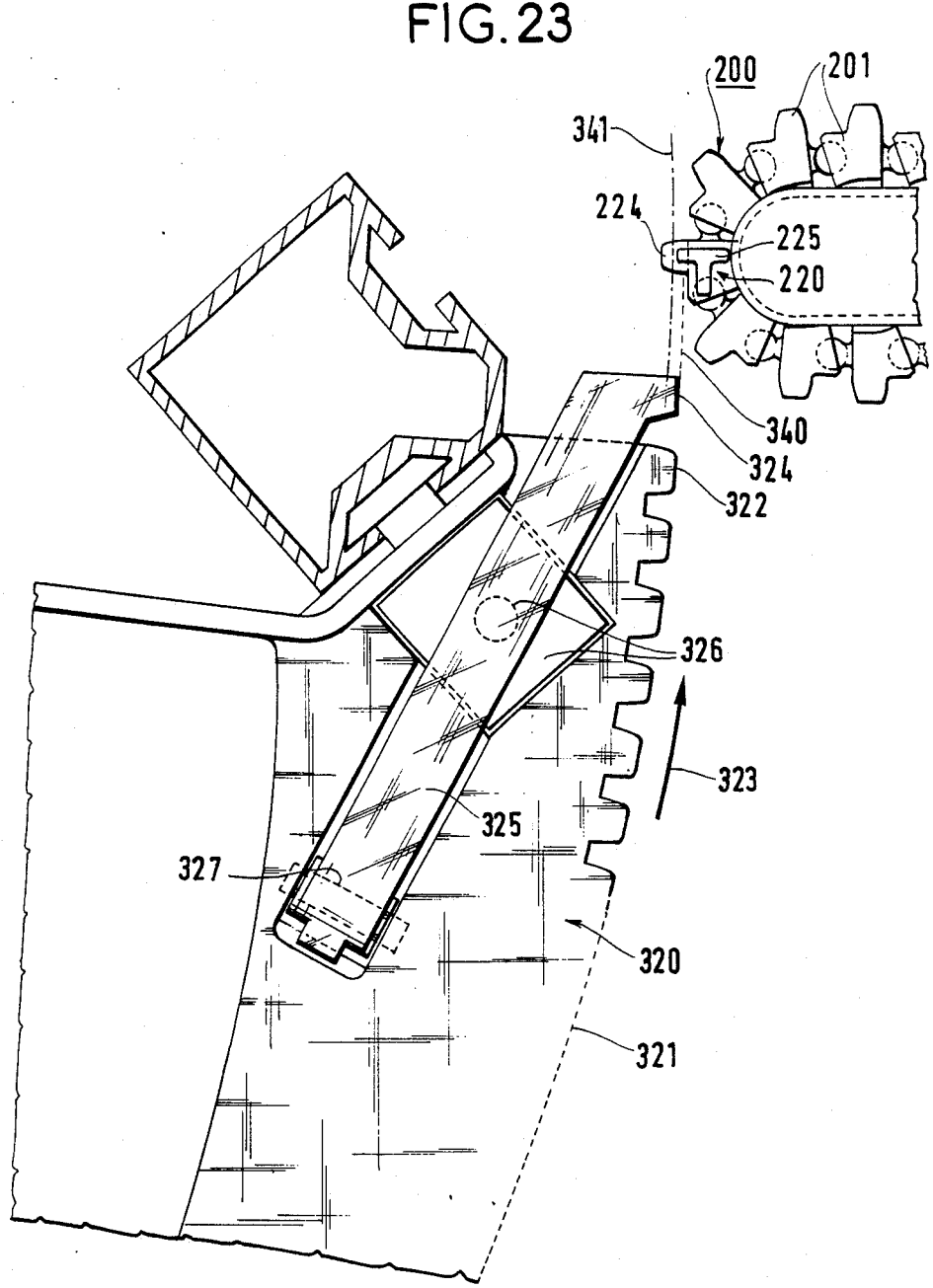
FIG. 23 is a plan view in greater detail of the FIG. 22 extraction control member.
Figure 24:
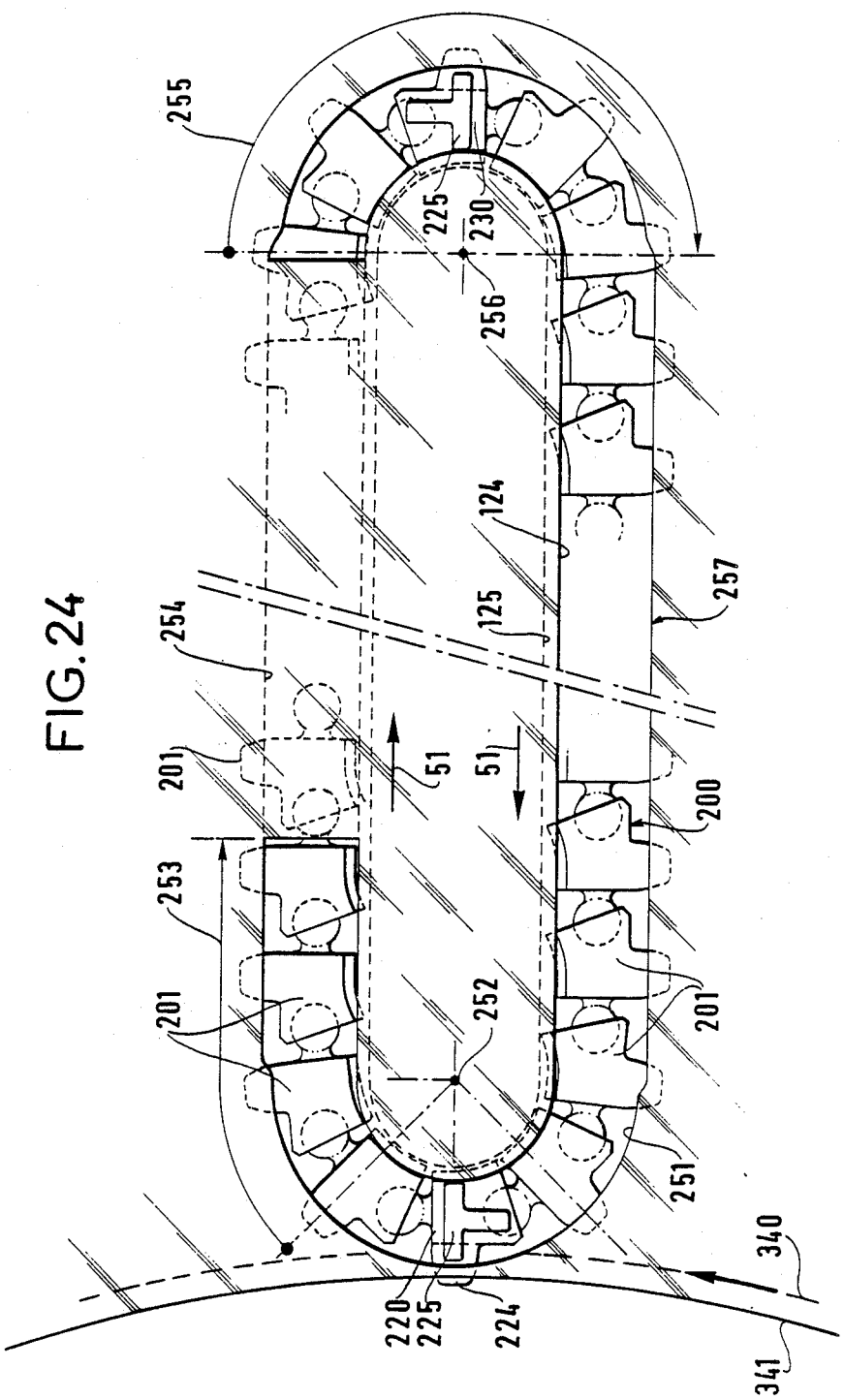
FIG. 24 is a more detailed view of the chain for cooperating with the FIG. 23 extraction control member.

Thus, in the variant shown in FIGS. 22, 23, and 24, a frame 307 supports a plurality of fixed annular magazines about an axis 2, for example the magazine 311 shown partially in FIG. 22. The magazine 311 is fitted with radial housings 308, 309, each containing a stack of objects such as the box referenced 310 situated at the bottom of a stack.

Extraction control is provided at each level by an extraction control member 320 situated inside a cylinder defined by the annular magazines and rotated about the axis 2 in the direction of arrow 323 by a stepper motor or by a motor associated with an angle encoder. The members 320 for all of the levels are fixed to one another. The extraction control member 320 is constituted essentially by a metal sector having teeth on its periphery 321, and having a first tooth referenced 322. Ahead of this tooth 322 there is a moving tooth 324 carried on an arm 325 which pivots about an axis 327 under the control of an electromagnet 326. All of these items can be seen in the enlarged plan view of FIG. 23.

When the assembly 320 rotates, the outer edge of the teeth 321 follows a trajectory 340 in a horizontal plane. When the electromagnet 326 is not excited, the tooth 324 lies ahead of the tooth 322 and in the same plane. It follows the same trajectory 340 or possibly a similar trajectory in a slightly lower plane. When the electromagnet is excited, the arm 335 supporting the tooth 324 is pushed upwardly to a level higher than the toothed sector 321.

The object extraction control assembly is intended for cooperating with chains 200 situated beneath respective bottoms 331, 332, 333, in each housing of the annular magazines (see FIG. 22). The chain shown in FIG. 24 is entirely analogous to that described with reference to FIGS. 9 to 15. The same reference numerals have been used to indicate identical items. However, it can be seen in FIG. 24 that the trajectories 340 and 341 of the teeth of the extraction control member 320 are not oriented in the same way relative to the chain 200 as in the same way relative to the chain 200 as in the FIG. 9 variant.

In the variant described below, the link chain is replaced by another motion transmission device which operates using an equivalent principle.

Figure 25:
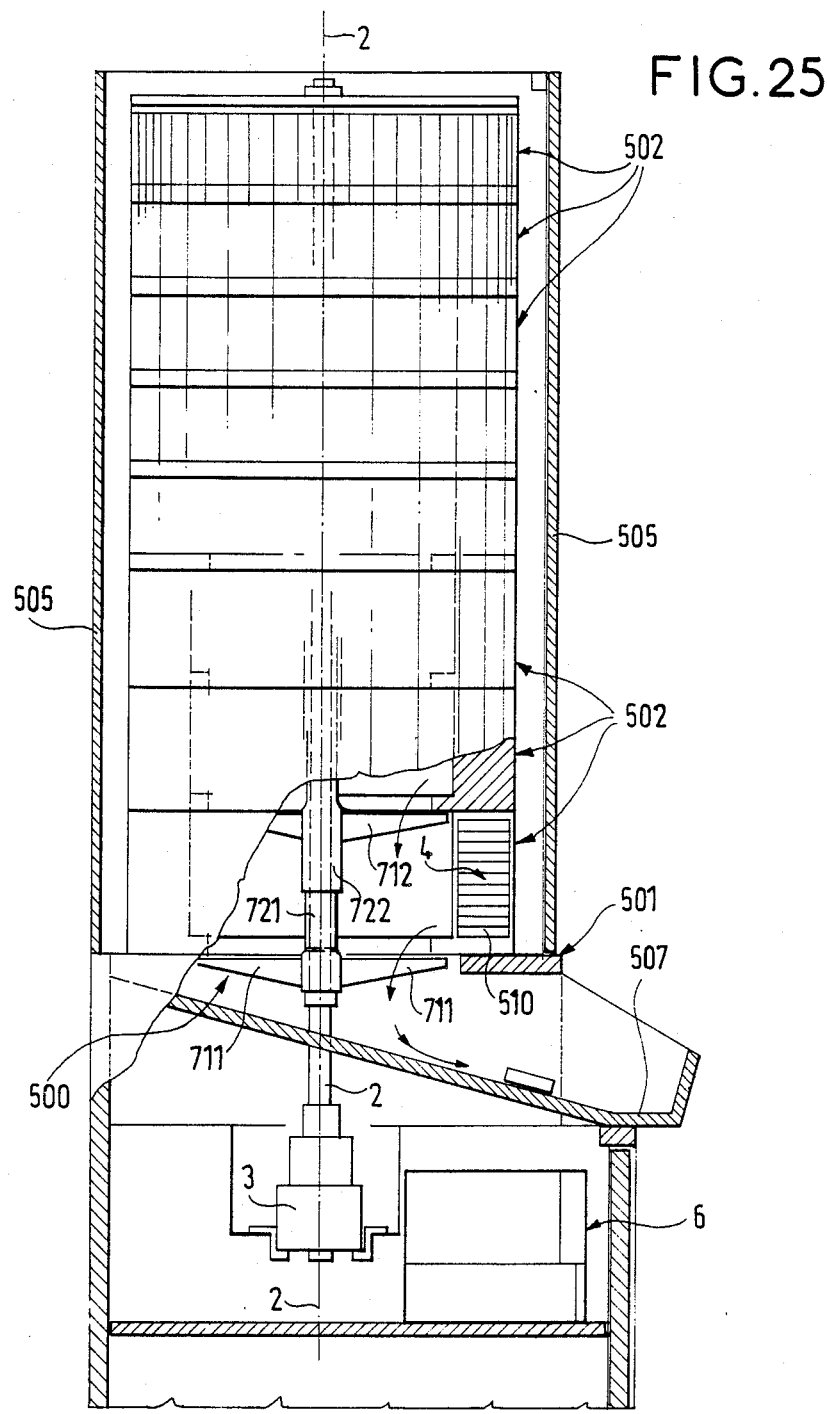
FIG. 25 is a diagrammatic and partially cutaway elevation view of another type of device in accordance with the invention and having fixed annular magazines.

FIG. 25 is a partially cutaway diagrammatic overall view of another example of a device in accordance with the invention. A frame 501 supports a plurality of fixed annular magazines 502 which are described in greater detail below. These magazines are superposed so that their axes of symmetry are aligned with the axis referenced 2. The above-mentioned magazines are provided with radial housings each containing a stack 4 of objects of a predetermined type. Reference 510 designates the object situated at the bottom of stack 4. As explained below, each housing is provided with means for extracting its object 510. Extraction control is provided by a unitary control assembly 500 situated inside the cylinder defined by the annular magazines and rotated about the axis 2 by a stepper motor 3 or by a motor including an angle encoder. The assembly is driven by a programmed computer 6. The objects extracted from the storage device are recovered in the reception zone 507. A protective cover for the set of magazines is referenced 505.

Figure 26:
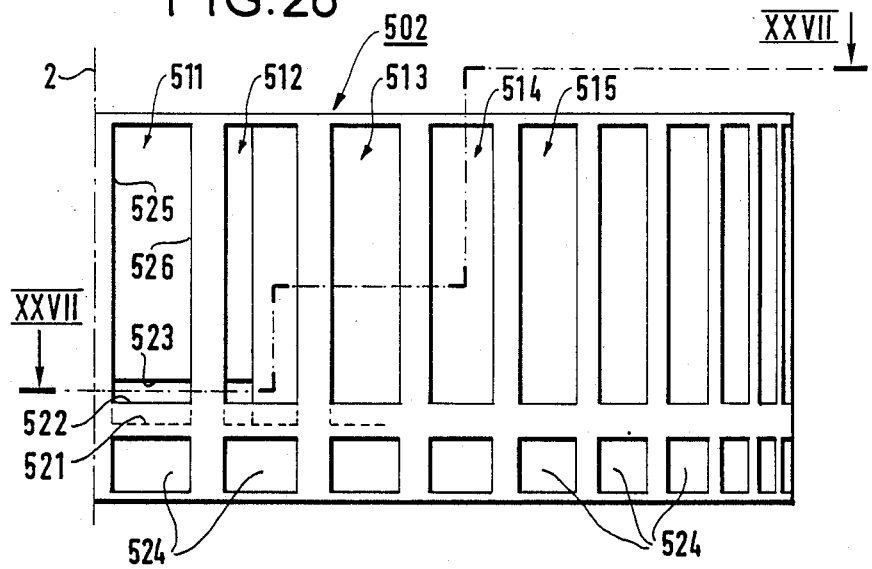
FIG. 26 is a diagrammatic fragmentary elevation view of an annular magazine belonging to the FIG. 25 device.
Figure 27:
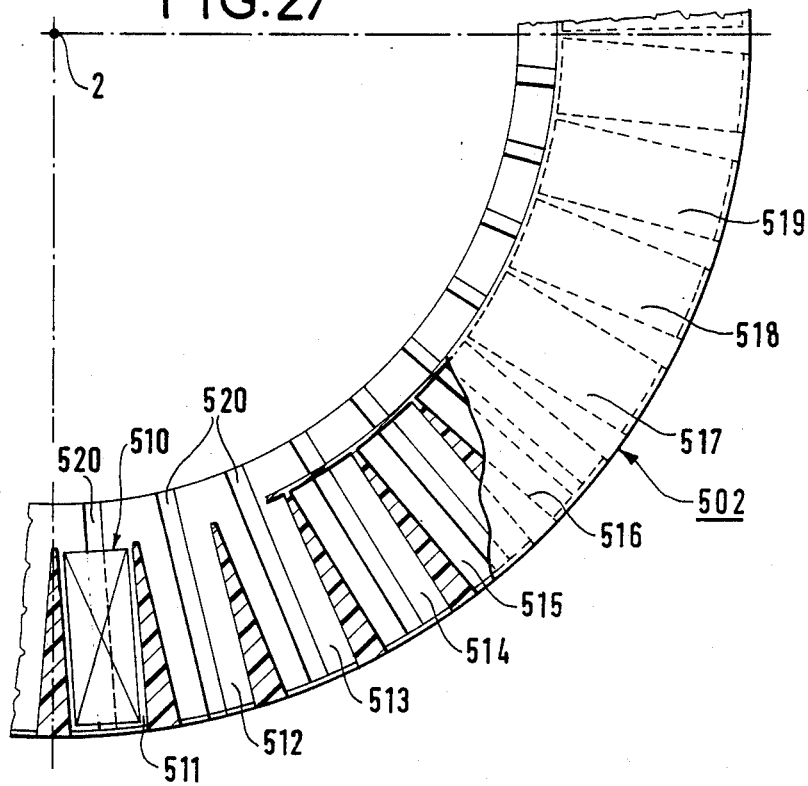
FIG. 27 is a plan view in section on line XXVII—XVII of FIG. 26.

FIGS. 26 and 27 are respectively a fragmentary elevation view and a plan view in partial section of an annular magazine, for example the magazine 502.

The top of the magazine 502 has about forty radial housings, and nine of them are referenced 511 to 519. The bottom 521 of each housing is provided with a slot 520 visible in FIG. 27. The outside wall of each housing is opened to enable it to be refilled with objects. It may have a rim 522 for holding the bottom object 510 in the stack. The wall of each housing situated closest to the axis 2 has a slot 523 which communicates with the slot 520 so as to allow the bottom object 510 to be removed towards the axis 2 of the device. The side walls 525 and 526 of each housing serve as guides for the stack.

Naturally, the width of each housing matches the width of the stack of objects, and the height of the slot 523 matches the thickness of each object.

The bottom of each magazine is fitted with a compartment 524 which communicates with the corresponding housing via a slot 520 and which serves to house the means for extracting the object 510. These extraction means are shown in FIGS. 28 to 31.

Figure 28:
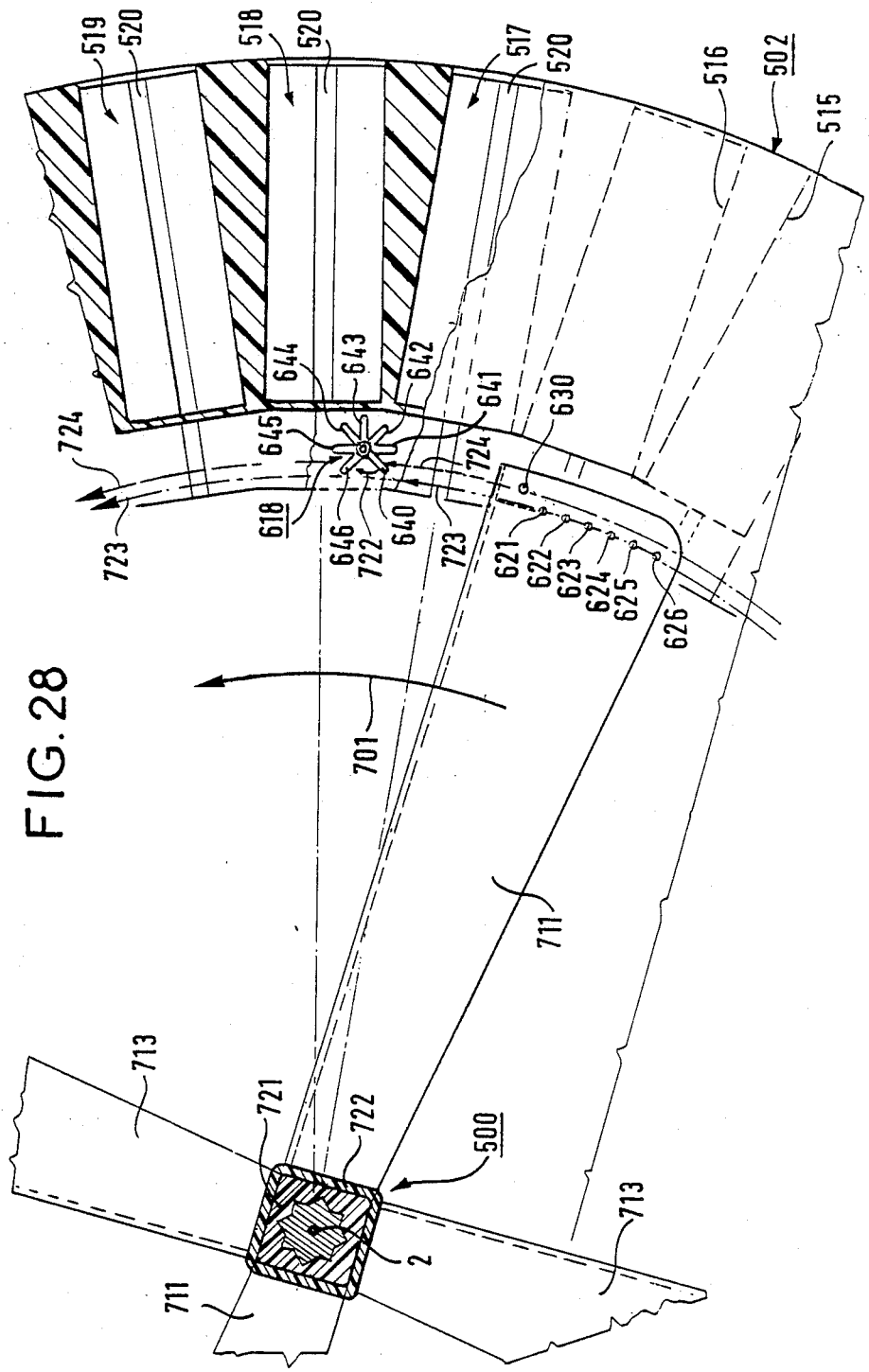
FIG. 28 is a plan view in partial section of the FIG. 26 annular magazine associated with a unitary assembly for controlling the extraction means.

FIG. 28 is a plan view of housings 516 to 519 together with the slots 520 of the annular magazine 502. The housing 518 is seen sideways on in FIG. 29 with its stack of objects 4 standing on the bottom 521, with its outer rim 522, and its removal opening 523 to allow the object 510 to leave. The associated compartment 524 contains a mechanical motion transmission device comprising:

a wheel 618 (FIG. 28) having seven teeth referenced 640 to 646 suitable for being rotated in the direction of arrow 722 and having one tooth missing between the teeth 640 and 646;

gear wheels 632 and 633 (see FIGS. 30 and 31) situated above the wheel 618 and suitable for being rotated by said wheel; and gear wheels 638 and 639, one of which (gear wheel 638) is driven by the gear wheel 633 and supporting a chain 634 bearing pegs 636 and 637 suitable for running along the slot 520.

All of the housings in all of the annular magazines are provided with extraction means as described above.

The control of these extraction means is now described.

FIGS. 25, 28, 29, 30, and 31 show a first embodiment.

Figure 29:
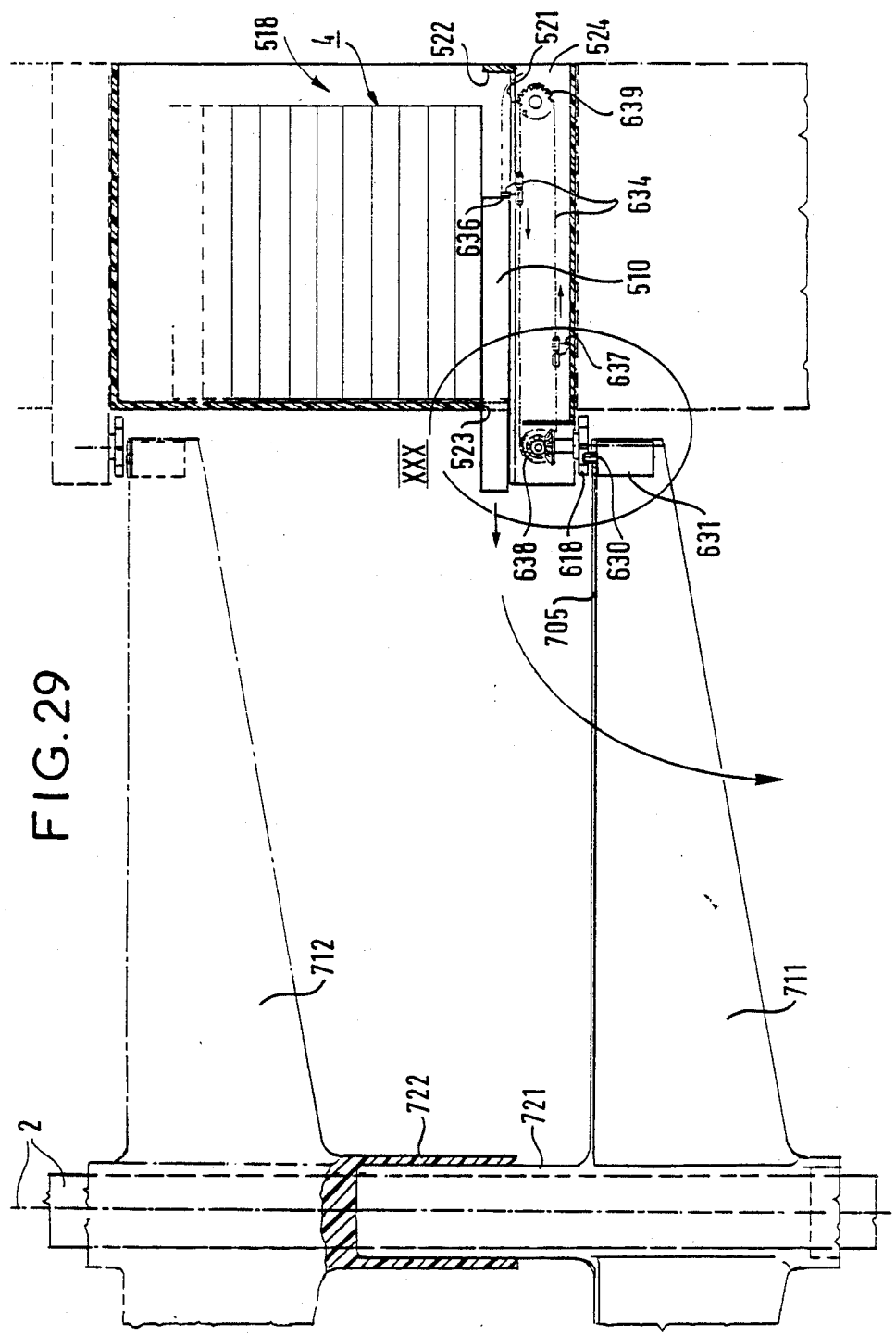
FIG. 29 is a diagrammatic view in partial section of the FIG. 25 storage device taken in a plane including the axis thereof and showing annular magazines associated with the unitary assembly for controlling the extraction means.
Figure 31:
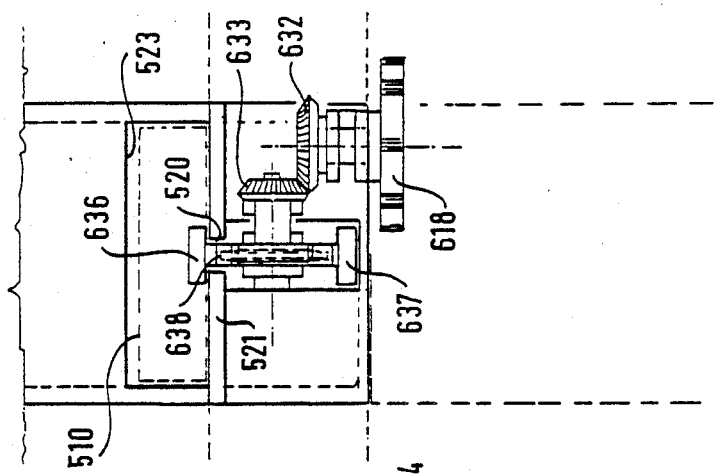
FIG. 31 is a side view associated with the view of FIG. 30.
Figure 30:
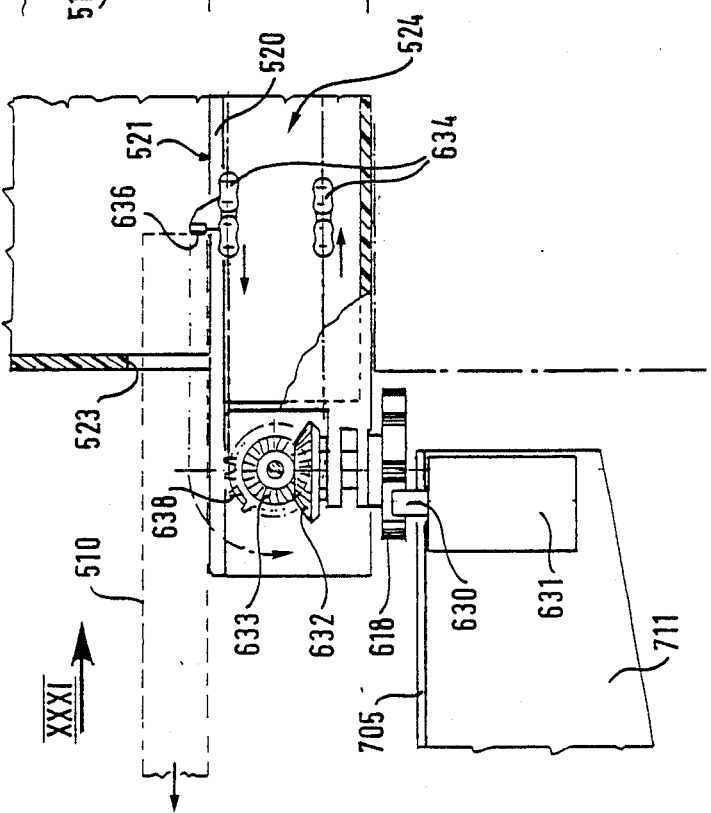
FIG. 30 is an enlarged view of the aperture appearing in FIG. 29.

Each magazine, i.e. each level of the storage device is associated with at least one control arm. In the present example four such arms are shown, comprising two diametrically opposite arms 711 together with two other diametrically opposite arms 713 at right angles to the two arms 711. These arms are mounted on a shaft 721 with the shaft 722 of the arms 712 of the adjacent level interfitting with the shaft 721. The set of shafts is driven simultaneously in rotation about the axis 2 by the stepper motor 3. As can be seen in FIG. 28, the arm 711 (and all the similar arms) is provided with a series of six fixed fingers 621 to 626 situated in a horizontal plane on a circle 723 centered on the axis 2, together with a retractable finger 630 situated on a circle 724 likewise centered on the axis 2 and lying in the same plane, but having a slightly larger diameter. In FIG. 29, the finger 630 is shown in its extended position. In its normal position it is retracted and does not project above the horizontal plane 705 of the arm 711. It is under the control of an electromagnet 631.

The device in accordance with the invention operates as follows: each housing has an address corresponding to the level of its magazine and to a determined rotary position of the stepper motor. Assume that the object 510 to be extracted is located in housing 518 of magazine 502 (see FIG. 28). The arm 711 for extracting the object 510 rotates together with its fixed fingers and its retracted finger 630. The fingers travelling in the direction of arrow 701 follow respective circular trajectories 723 and 724 and do not encounter any wheel analogous to the wheel 618. However, when the arm 711 comes up to the magazine 518 in question, the finger 640 leaves its housing and on its trajectory 724 it encounters the tooth 640, thereby rotating the wheel 618. The fixed fingers 621 to 626 continue this rotation by successively encountering the teeth 640 and 646. The chain 634 is thus driven together with is pegs 636 and 637 (see FIGS. 30 and 31). The gear wheels 632 and 633 are designed so as to ensure that the peg 646 has a sufficient stroke to remove the object 510.

For example:

the stepper motor rotates once every four seconds, at 400 steps per rotation;

the device comprises ten annular magazines having forty housings each, thus providing storage for 400 different types of object; and the set of superposed annular magazines has a height of about 1.5 meters (m) and a diameter of 1 m. They are preferably made of molded plastic as are the arms of the unitary control assembly.

If two arms are provided per level, 400 objects can be accessed in two seconds. One of the arms can be attributed to even numbered objects and the other to odd numbered objects.

If four or more arms are provided per level, the speed of rotation of the motor can be reduced.

In a medical dispensary, the number of medicines accessible in two seconds corresponds to the number on the prescription. This provides most advantageous dispensing performance, by means of a structure whose components are all very cheap.

FIGS. 32 and 33 show a variant embodiment of the means for controlling the motion of the object extractor chains.

These figures show the same housing 518, slot 520 in its bottom 521, and arm 711 rotated in the direction of arrow 801. In this variant, the retractable finger 830 controlled by the electromagnet 831 has a circular trajectory 870 which is smaller in diameter than the trajectory 860 of the fixed fingers 821 to 827. The wheel 818 about the axis 819 forming part of the mechanical device for transmitting movement to the housing 518 is provided with a tooth 840 which is longer than the other teeth 841 to 847, and which is situated level with a missing tooth and in a place which is above the other teeth (see FIG. 33).

It can clearly be seen from the figures that if an object 510 of the compartment 518 is to be removed, the finger 830 in its extended position engages the tooth 840, thereby rotating the wheel 818 in the direction of arrow 802, and the other fingers 821 to 827 successively engage the teeth 841 to 847, thereby rotating the wheel 818 until it returns to its initial position.

Figure 34:
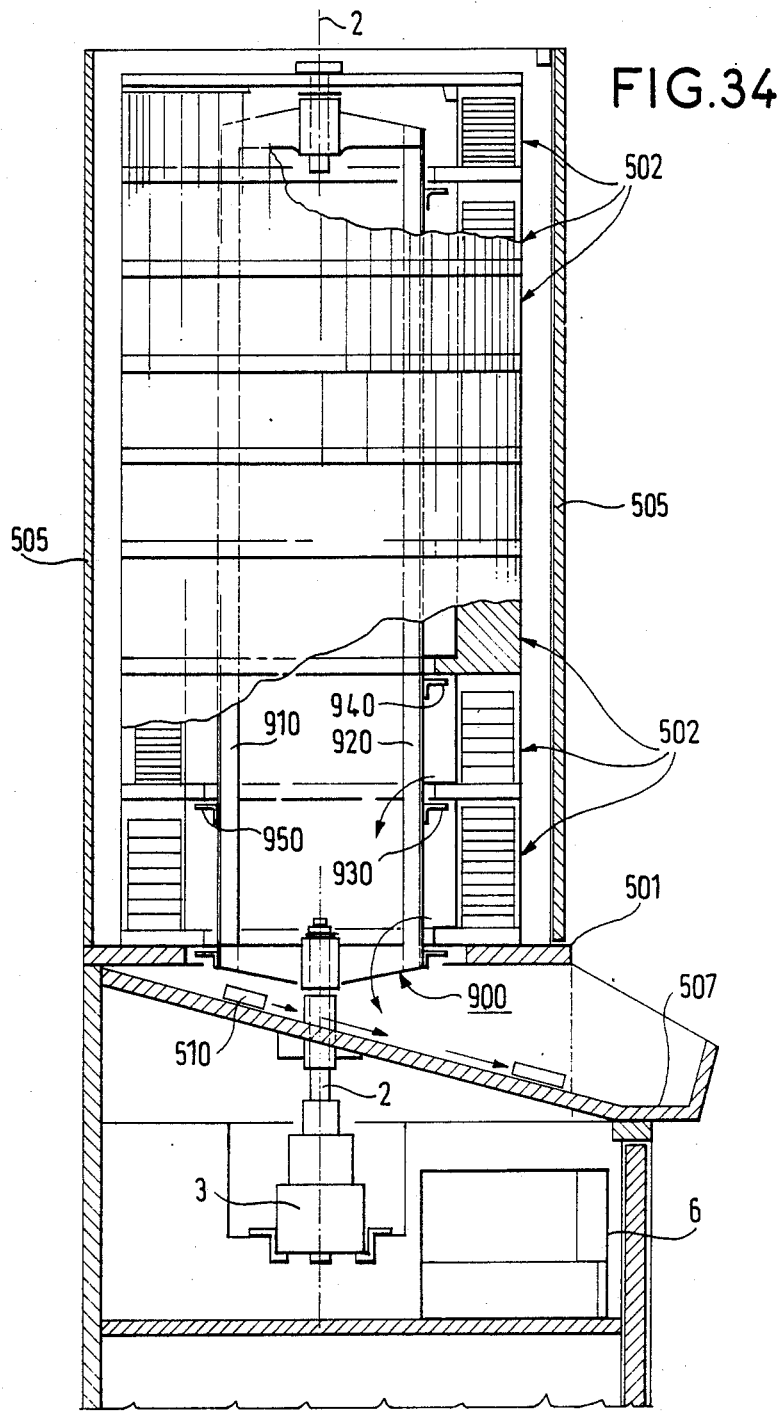
FIG. 34 is a view similar to FIG. 25 showing a variant of the unitary assembly for controlling the extraction means.

FIG. 34 shows a variant of the unitary assembly for controlling the extraction means.

Instead of arms mounted on a common shaft, there is a cage 900 which rotates about the axis 2, inside the annular magazines 502 and including, for example, two, four, or eight vertical bars. The figure shows two bars 910 and 920. At each level, the bars carry the fixed fingers and the retractable finger as described above. These are shown highly diagrammatically for zones referenced 930, 940, and 950.

The principle whereby extraction takes place is completely identical to that described with reference to the preceding figures.

Naturally the invention is not limited to the variants described above. Without going beyond the scope of the invention any of the means described may be replaced by equivalent means.

We claim:

1. A device for storing and dispensing objects, comprising:

a plurality of superposed fixed annular magazines having a common axis of symmetry, each magazine including a top portion having radial housings each suitable for containing a stack of objects of a given type, each housing having a wall closest to said axis having an opening for passing the bottom object of the stack, each housing having a bottom portion, a slot opening out into said opening and into said bottom portion for each of said housings, extraction means for extracting the bottom object of the corresponding stack disposed in said bottom portion of each of said housing, each said extraction means including a mechanical device for transmitting motion and being provided with a chain including pegs for passing through said slot;

a unitary assembly for controlling the extraction means situated in a cylindrical space inside the annular magazines and rotatable about said common axis of symmetry, a motor rotatably driving said unitary assembly, said assembly bearing at least one arm at each level corresponding to a magazine, each arm having a first end with a shaft disposed about said axis of symmetry and received in the shaft of an arm situated adjacent thereto, each said arm having an opposite end bearing a controllable mechanical member including a retractable finger describing a circular trajectory during the rotary movement of said unitary assembly and capable during its motion of optionally driving one of said mechanical devices for transmitting motions; and a programmed computer controlling said mechanical member as a function of its angular position relative to said housings, said angular position being defined by said motor.

2. A storage device according to claim 1, wherein each said mechanical device for transmitting motions includes only one tooth lying on the trajectory of said retractable finger.

3. A storage device according to claim 2, wherein said wheel includes other teeth operatively engaging fixed fingers disposed in the proximity of said controllable mechanical member, and said fixed fingers movable along a circular trajectory having a different diameter from the circular trajectory of said retractable fingers.

4. A storage device according to claim 3, wherein said chain has pegs and said wheel transmits motion to said chain pegs via a set of intermeshed gears.

* * * * *